(12) United States Patent
Absalonson

(10) Patent No.: US 7,644,491 B2
(45) Date of Patent: Jan. 12, 2010

(54) DEVICE FOR ASSEMBLING COMPOSITE STRUCTURE INCORPORATING FLIPPER ASSEMBLIES

(75) Inventor: Joseph E. Absalonson, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 688 days.

(21) Appl. No.: 11/582,217

(22) Filed: Oct. 17, 2006

(65) Prior Publication Data
US 2008/0092372 A1  Apr. 24, 2008

(51) Int. Cl.
*B25B 11/00* (2006.01)
(52) U.S. Cl. .............................. 29/700; 29/703; 29/771; 29/434; 29/466; 29/468
(58) Field of Classification Search .................... 29/700, 29/703, 729, 709, 771, 428, 434, 468, 466; 156/242, 245, 166, 434, 468, 466, 446, 580, 156/583.8, 443, 583.1, 230
See application file for complete search history.

(56) References Cited

U.S. PATENT DOCUMENTS 2,829,759 A * 4/1958 Parker ........................ 198/403
4,980,013 A 12/1990 Lowery
5,538,589 A 7/1996 Jensen et al.

* cited by examiner

*Primary Examiner*—Sam Chuan C Yao
*Assistant Examiner*—Christopher Besler
(74) *Attorney, Agent, or Firm*—Tung & Associates

(57) ABSTRACT

A device for assembling a composite structure is disclosed. An illustrative embodiment of the device includes a table module, a first plurality of flipper devices carried by the table module and a second plurality of flipper devices carried by the table module in adjacent and adjustable relationship with respect to the first plurality of flipper devices, respectively. The first plurality of flipper devices and the second plurality of flipper devices are capable of accommodating a variation in thickness of the composite structure.

12 Claims, 19 Drawing Sheets

DEVICE FOR ASSEMBLING COMPOSITE STRUCTURE INCORPORATING FLIPPER ASSEMBLIES

FIELD

The present invention relates to apparatuses and methods for assembling composite structures such as aircraft stringers. More particularly, the present invention relates to a composite structure assembly table and method for the automated assembly of composite structures such as aircraft wing stringers.

BACKGROUND

Composite structures are used extensively in aircraft and other applications in which materials having a high strength-to-weight ratio are necessary. However, composite structures are costly since fabrication of such structures requires the layering of multiple materials. Depending on the particular application, a composite structure may be formed by layering individual sheets of material either manually or using an automated apparatus.

One type of composite structure which is commonly used as a support element in aircraft is the "I" beam or "T" stringer. These beam-type composite structures are generally formed by manually placing layers of composite material over a lay-up mandrel. An automated cutting machine cuts each layer of material, or prepreg, to the proper shape. The individual layers of the prepreg are then manually placed on separate lay-up mandrels. Once positioned, each layer of prepreg is manually conformed to the exterior contour of each lay-up mandrel to form two C-channels. Next, the C-channels and lay-up mandrels are rotated to facilitate joining of the C-channels to each other along their webs to form an I-beam. A radius filler is then placed in the triangular recesses formed in the center of the top and bottom flanges of the I-beam. Top and bottom composite reinforcement layers are then manually placed over the radius filler, which is then bagged and autoclave-cured.

The manual I-beam or stringer fabrication process is labor-intensive, time-consuming and attended by quality control issues. Therefore, automated methods of fabricating composite structures are being developed due to the drawbacks which are associated with manual fabrication of composite structures.

SUMMARY

The present invention is generally directed to a device for assembling a composite structure. An illustrative embodiment of the device includes a table module, a first plurality of flipper devices carried by the table module and a second plurality of flipper devices carried by the table module in adjacent and adjustable relationship with respect to the first plurality of flipper devices, respectively. The first plurality of flipper devices and the second plurality of flipper devices are capable of accommodating a variation in thickness of the composite structure.

BRIEF DESCRIPTION OF THE DRAWINGS

The invention will be described, by way of example, with reference to the accompanying drawings, in which.

DETAILED DESCRIPTION

Figure 1:
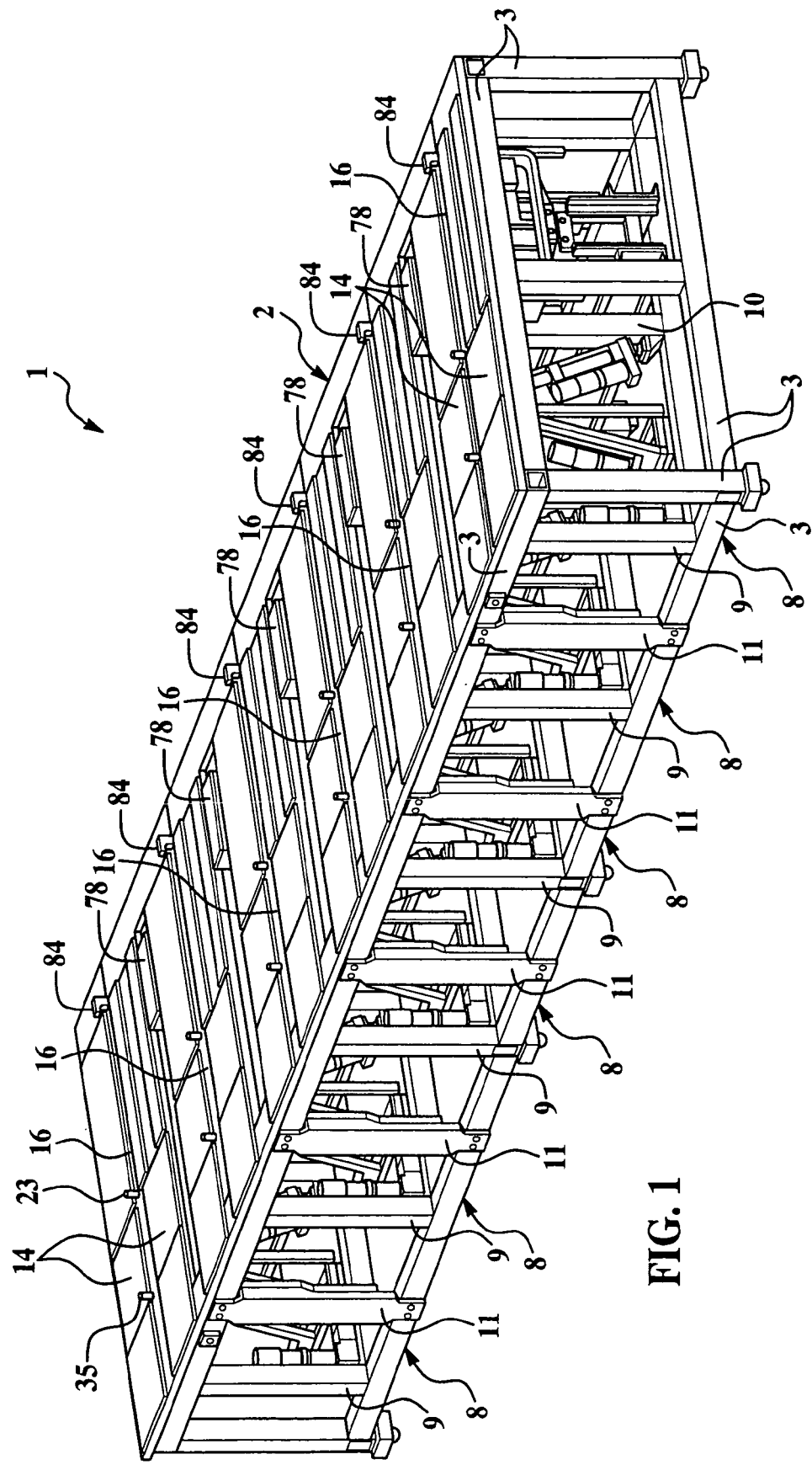
FIG. 1 is a perspective view of a table module of an illustrative embodiment of the structure assembly table, which table module includes multiple adjacent module units.
Figure 2:
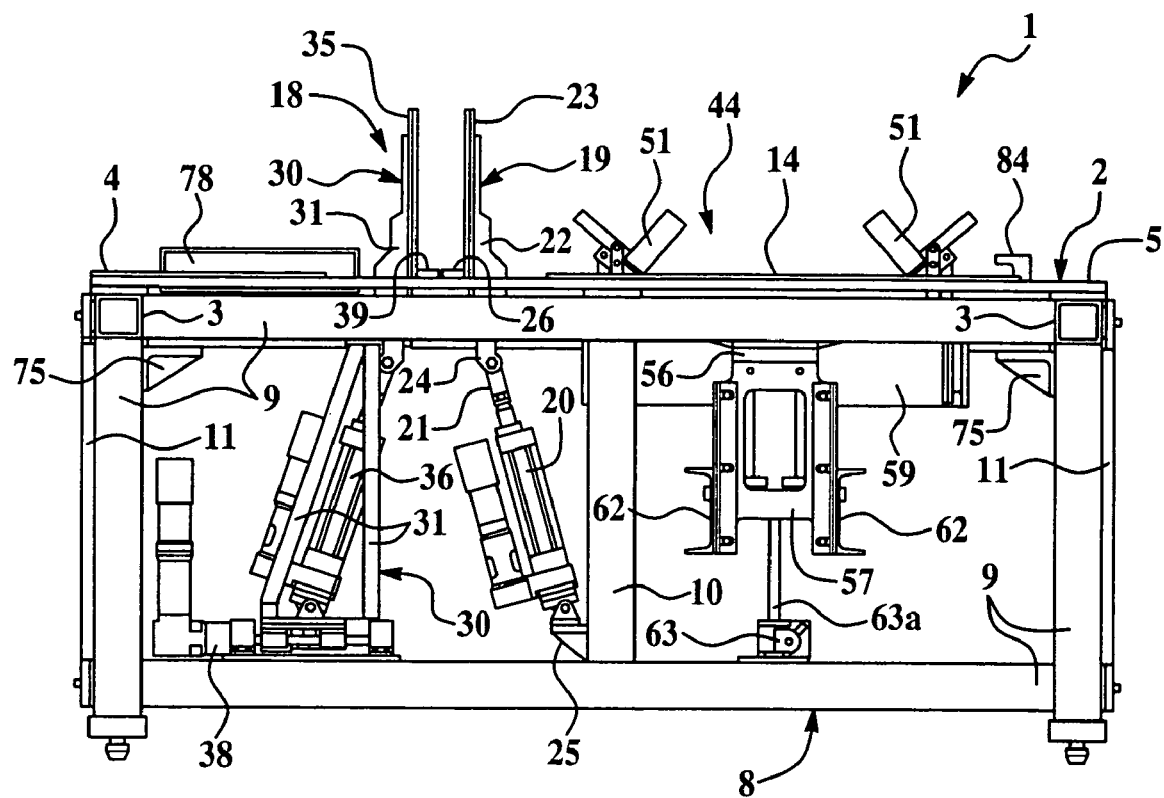
FIG. 2 is an end view of a module unit of the structure assembly table, more particularly illustrating a riser block, a flipper assembly, a flopper assembly and a compactor head which in concert with each other implement automated fabrication of a composite structure.

Referring to FIGS. 1-8, an illustrative embodiment of the structure assembly table is generally indicated by reference numeral 1. As shown in FIG. 1, the structure assembly table 1 includes a table module 2 having a generally elongated, box-shaped table module frame 3. The table module 2 includes multiple, adjacent module units 8, each of which is a functional subunit of the structure assembly table 1. In the illustrative embodiment of the invention shown in FIG. 1, the structure assembly table 1 includes six module units 8; however, it is to be understood that the structure assembly table 1 may have a smaller or larger number of module units 8 depending on the application of the structure assembly table 1. As shown in FIG. 2, for purposes of description herein, the structure assembly table 1 has an operator side 4 and a non-operator side 5.

As will be hereinafter described, the structure assembly table 1 is suitable for implementing the assembly of a composite structure 87 (FIG. 3) such as an aircraft wing stringer, for example. The structure assembly table 1 is highly reconfigurable via computer software modifications. The modularity of the structure assembly table 1 accommodates multiple composite structure configurations. The modular components of the structure assembly table 1 are designed to be interchangeable and serviceable through typical remove-and-replace methods. Multiple structure assembly tables 1 can be placed in end-to-end relationship with respect to each other to facilitate fabrication of composite structures having various sizes and configurations.

As will be hereinafter further described, the structure assembly table 1 includes a bank of six devices or assemblies which are operable to index, lift, rotate and set individual and opposite composite structure subassemblies such as stringer mandrels, for example. Another bank of five computer-controlled shuttling or positioning devices or assemblies lifts and positions the two composite structure subassemblies relative to each other and ensures proper spacing and parallelism of the subassemblies through a series of sensing routines. A bank of six computer-controlled pneumatic compactor devices compacts the individual subassemblies together, after which a bank of flipper assemblies rotates the composite structure to the operator side 4 of the structure assembly table 1. The flipper assemblies capture the subassemblies and position the subassemblies with respect to each other while accommodating for taper and ply thickness changes along the length of each to securely rotate the composite structure. In cases in which the composite structure is an aircraft stringer, after radius filler and cap are manually applied to one exposed side of the mandrel assembly, the flipper assembly then rotates the mandrel assembly back to the non-operator side 5 of the structure assembly table 1 where the mandrel assembly is then lifted and shuttled back to the operator side 4 for application of radius filler and cap on the opposite side of the assembly.

As shown in FIGS. 1 and 2, each module unit 8 includes a generally elongated, rectangular module unit frame 9 which is supported by the table module frame 3. A frame divider 10 may extend through the center portion of the module unit frame 9. As shown in FIG. 1, unit connectors 11 connect the module unit frames 9 of the adjacent module units 8 to each other. A top plate 14 is provided on the table module frame 3, between adjacent module units 8. A module slot 16 extends between adjacent top plates 14.

Figure 3:
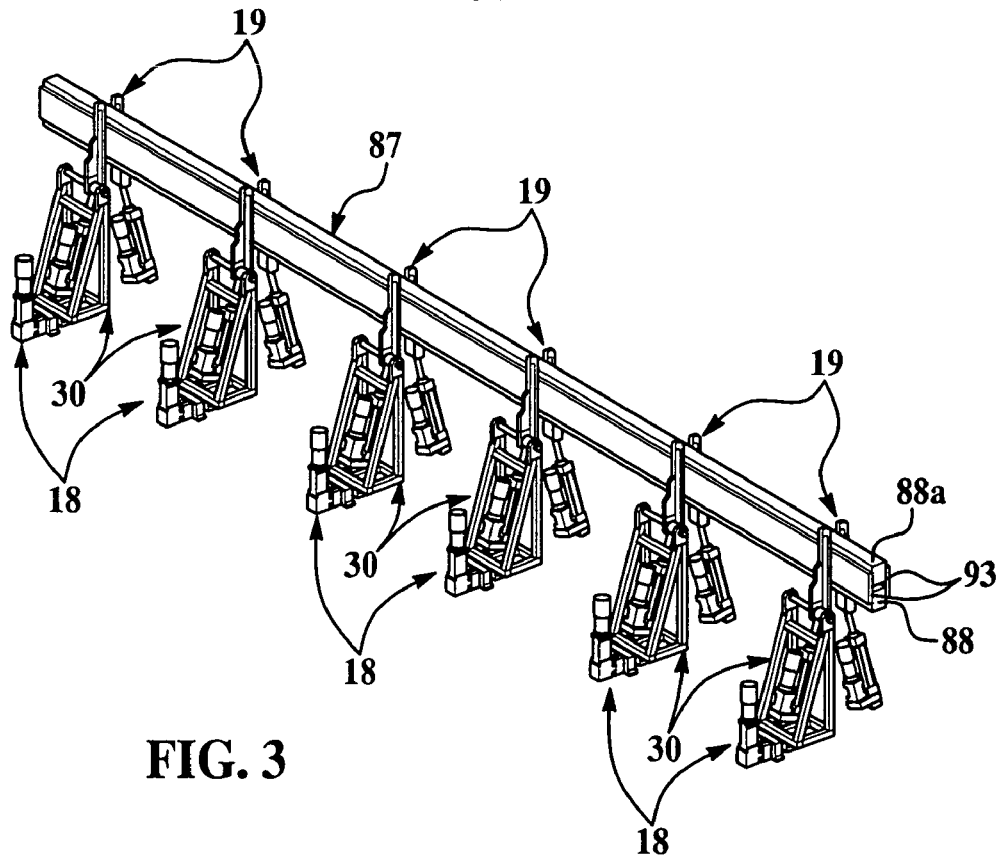
FIG. 3 is a perspective view of multiple flipper assemblies in respective module units (not shown) of the structure assembly table, with a composite structure being positioned by the flipper assemblies.

As shown in FIGS. 2 and 3, each module unit 8 of the table module 2 includes a flipper assembly 18. As shown in FIG. 3, the flipper assemblies 18 of the respective module units 8 form a bank of flipper assemblies 18 which carry out the rotating functions of the structure assembly table 1, as will be hereinafter described. Each flipper assembly 18 is disposed beneath the module slot 16 of each corresponding module unit 8. Each flipper assembly 18 includes a fixed position flipper device 19 typically having an electro/mechanically actuated linear positioning screw 20 which is pivotally attached to the module unit frame 9 via a pivot pin 25. A ballscrew 21 is extendable from the ballscrew housing 20. A flipper blade frame 22 is pivotally attached to the ballscrew 21 via a pivot pin 24. A generally elongated, rectangular flipper blade 23 is provided on the flipper blade frame 22. Accordingly, by selective actuation of the actuating ballscrew housing 20 and actuating ballscrew 21, the flipper blade 23 of the fixed position flipper device 19 can be positioned between a generally horizontal position (not shown) and the generally vertical position shown in FIG. 27, in which vertical position the flipper blade 23 extends through the module slot 16 of the corresponding module unit 8. A support pin 26 extends from the proximal end portion of the flipper blade 23, in generally perpendicular relationship with respect to the longitudinal axis of the flipper blade 23.

Figure 4:
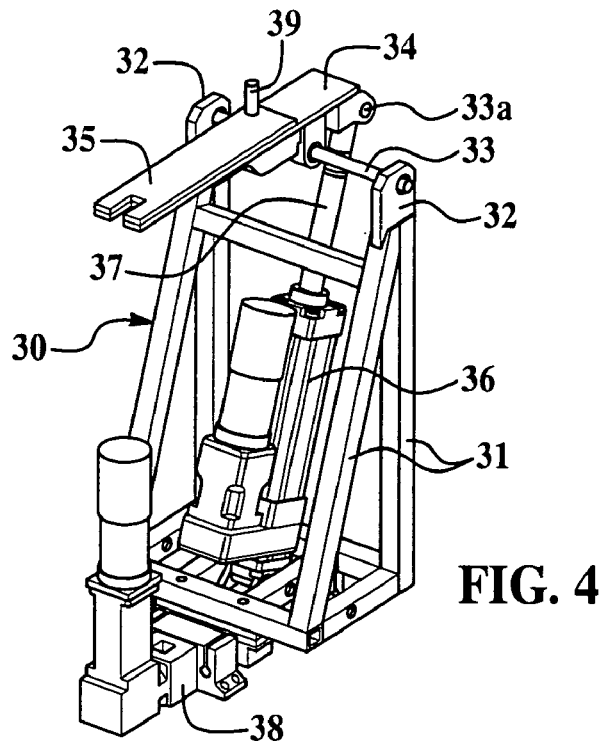
FIG. 4 is a perspective view of an adjustable position flipper element of each flipper assembly.

As shown in FIG. 3, each flipper assembly 18 further includes an adjustable position flipper device 30 which is opposite the fixed position flipper device 19. As shown in FIG. 4, the adjustable position flipper device 30 includes a containment frame 31. The containment frame 31 is provided on a linear slide 38, which is typically ballscrew actuated, to facilitate selective movement of the containment frame 31 toward and away from the corresponding paired or opposite fixed position flipper device 19. A ballscrew housing 36 is provided in the containment frame 31. A ballscrew 37 is selectively extendable from the ballscrew housing 36.

A pair of spaced-apart frame flanges 32 extends from the containment frame 31. A pivot rod 33 extends between the frame flanges 32. An elongated flipper blade frame 34 is pivotally mounted on the pivot rod 33. As further shown in FIG. 4, on one side of the pivot rod 33, the ballscrew 37 pivotally engages a first end of the flipper blade frame 34 via a pivot pin 33a. A generally elongated, rectangular flipper blade 35 extends from a second end of the flipper blade frame 34 on the opposite side of the pivot rod 33. Accordingly, by selective actuation of the ballscrew housing 36 and ballscrew 37, the flipper blade 35 of the adjustable position flipper device 30 can be positioned between a generally horizontal position (not shown) and the generally vertical position shown in FIG. 27, in which vertical position the flipper blade 35 extends through the module slot 16 of the corresponding module unit 8. A support pin 39 extends from the proximal end portion of the flipper blade 35, in generally perpendicular relationship with respect to the longitudinal axis of the flipper blade 35. A controller (not shown) is connected to the ballscrew housing 20 of each fixed position flipper device 19 and the ballscrew housing 36 of each adjustable position flipper device 30 to facilitate operation of the flipper assemblies 18 of the module units 8 in concert with each other.

Figure 5:
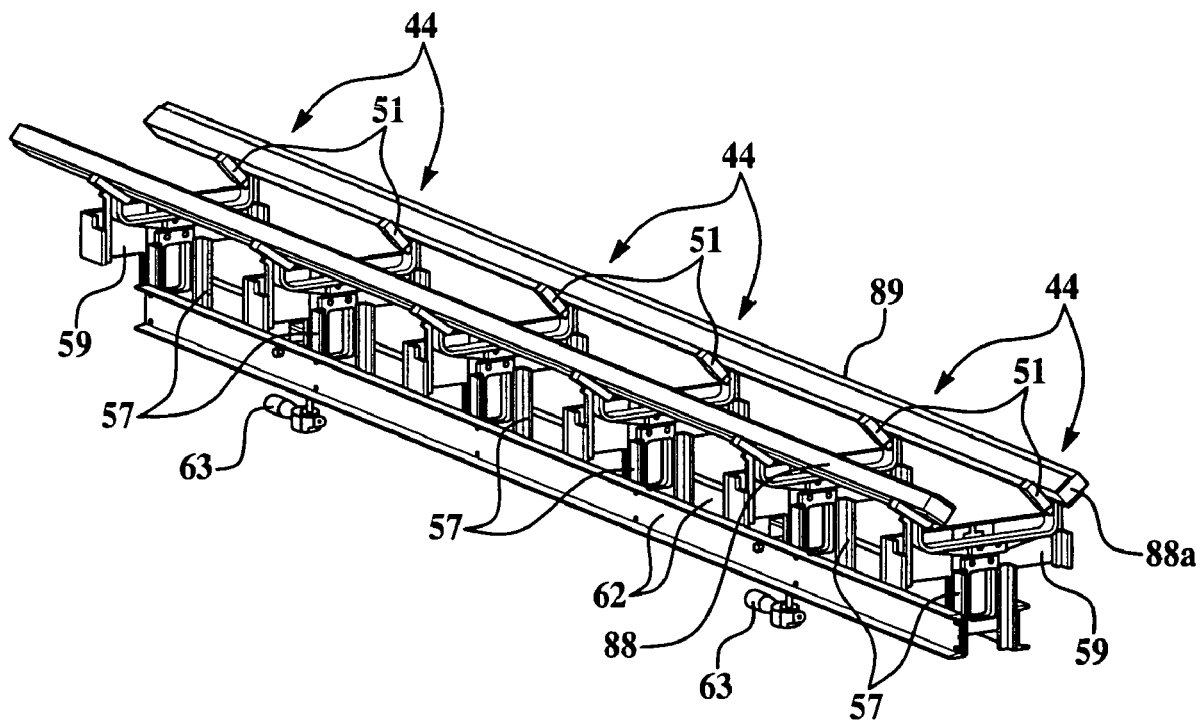
FIG. 5 is a perspective view of multiple flopper assemblies in respective module units (not shown) of the structure assembly table, with separate components of a composite structure being positioned by the respective flopper assemblies.
Figure 6:
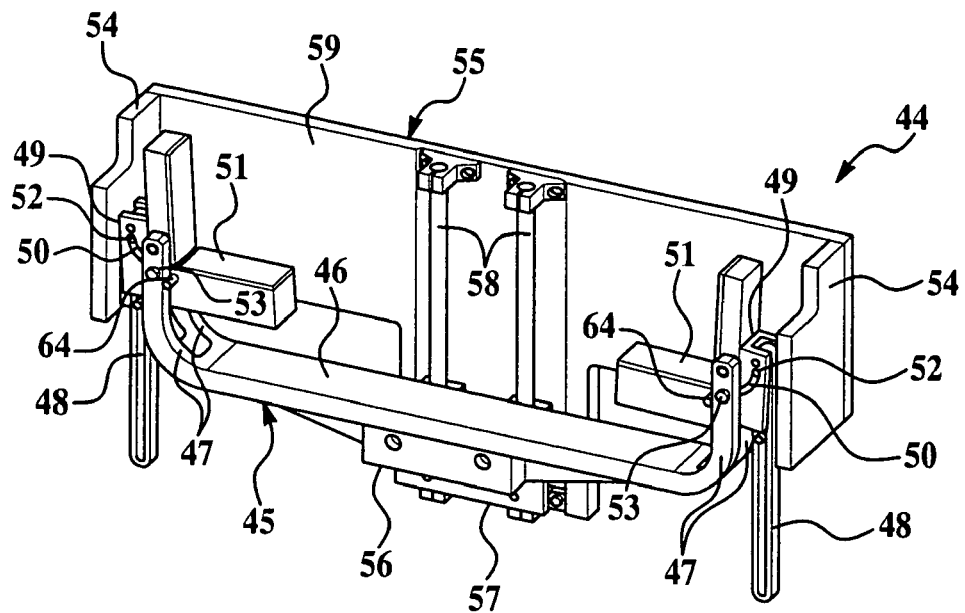
FIG. 6 is a perspective view of a flopper assembly of a corresponding module unit of the structure assembly table.

As shown in FIGS. 2, 5 and 6, each module unit 8 of the table module 2 further includes a flopper assembly 44 which is adjacent to the corresponding flipper assembly 18. The flopper assemblies 44 are adapted to index, lift, rotate and set opposing composite structure subunits in a simple linear actuation preparatory to fabrication of the composite structure. As shown in FIG. 2, the flipper assembly 18 and the flopper assembly 44 are typically located on opposite sides of the frame divider 10. The flopper assemblies 44 of the respective module units 8 form a bank of flopper assemblies 44 which carry out relative placement or positioning of the composite structure component subunits with respect to each other in operation of the structure assembly table 1, as shown in FIG. 5 and will be hereinafter described. As shown in FIG. 6, each flopper assembly 44 includes a three-walled cabinet 55 having a track plate 59 which is attached to the module unit frame 9 of each module unit 8 according to the knowledge of those skilled in the art. A pair of spaced-apart side plates 54 extends from respective ends of the track plate 59. At least one carriage track 58 is provided on the track plate 59. As shown in FIG. 6, a pair of generally parallel, spaced-apart carriage tracks 58 may be provided on the track plate 59. A linear rail carriage 57 slidably engages the carriage tracks 58. A yoke assembly 56 is provided on the linear rail carriage 57. As shown in FIG. 2, a pair of jack screw housing servo motors (I/O) includes a pair of jack screw housings 63 provided on the module unit frame 9. A pair of jack screws and ball nuts 63a is extendable from the stabilizing jack screw housings 63, respectively. The stabilizing jack screws and ball nuts 63a engage the linear rail carriage 57 through a gang connection 62 and actuate movement of the linear rail carriages 57 of the flopper assemblies 44 in concert along the respective pairs of carriage tracks 58.

As shown in FIG. 6, a flopper frame 45 includes an elongated crosspiece 46 which is provided on the yoke assembly 56. A slotted cradle support 47 extends from each end of the crosspiece 46. Cradle position blocks 49 and 51 are pivotally attached to each cradle support 47. Accordingly, a curved track groove 50 provides tracking on cradle position block 49. A ball plunger 53 extends through a plunger opening (not shown) provided in the cradle support 47 and through to the track groove 50. An elongated slider link 48 is attached to each side plate 54 of the cabinet 55. Each cradle position block 49 is pivotally attached to the corresponding slider link 48 typically via a pivot pin (not shown) located above a ball detent 52 which extends through the slider link 48 and position block 49.

Figure 13:
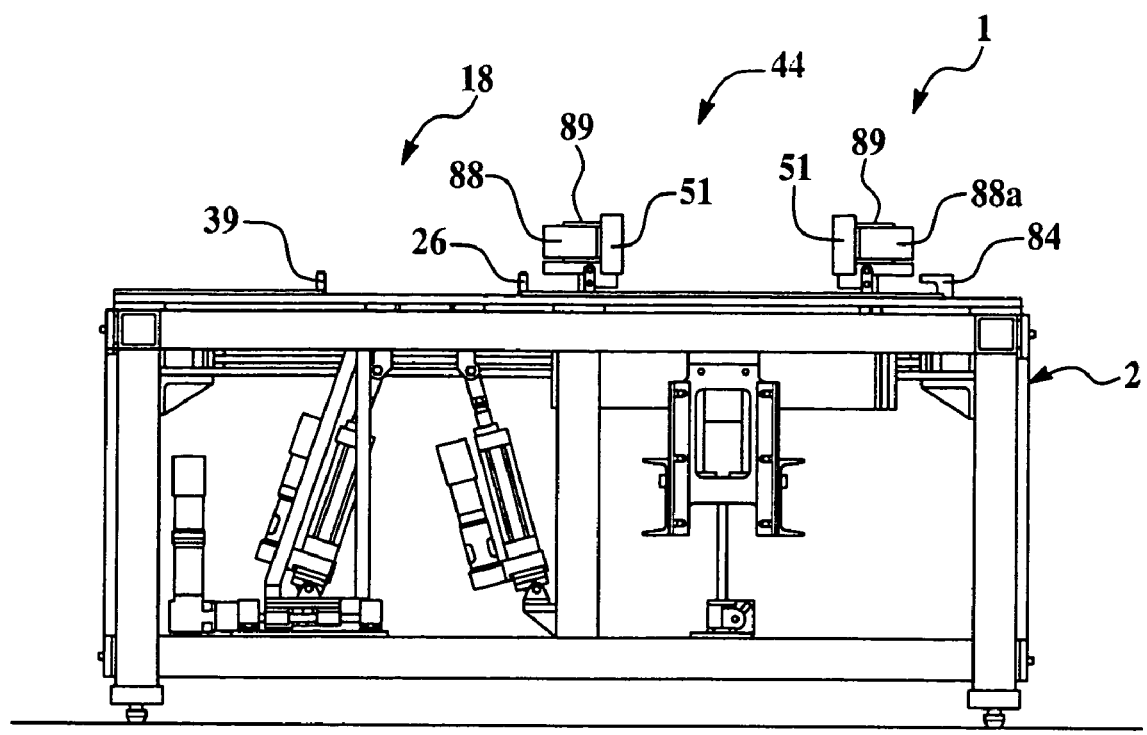
Figure 14:
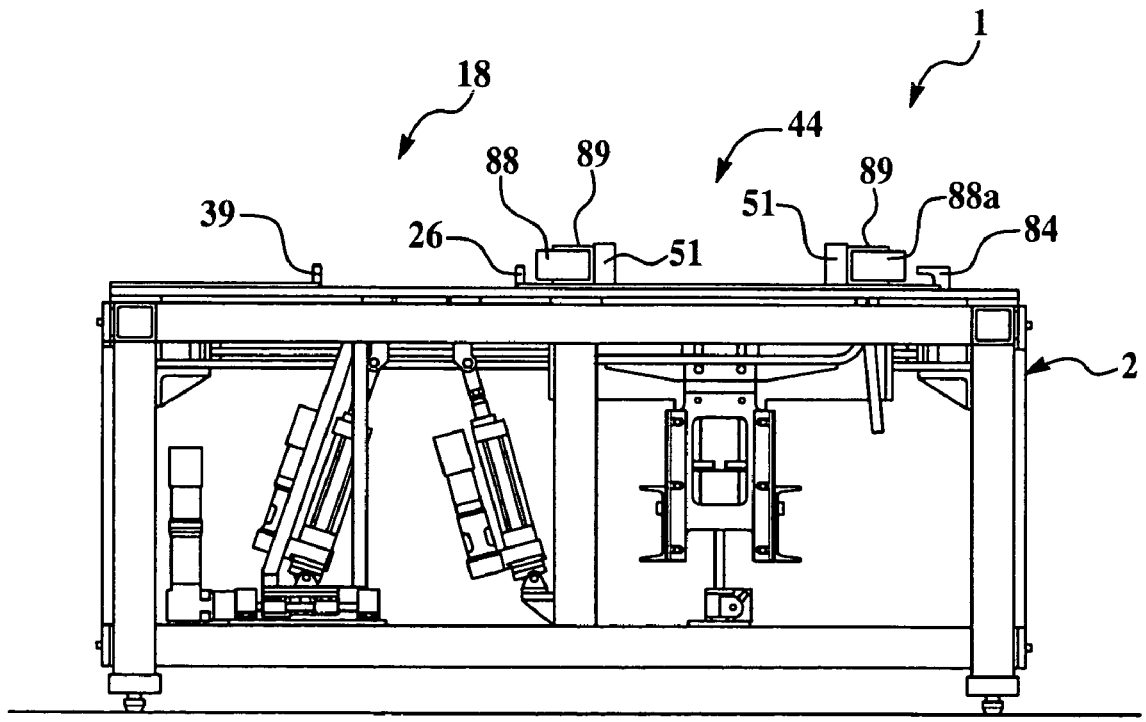
Figure 15:
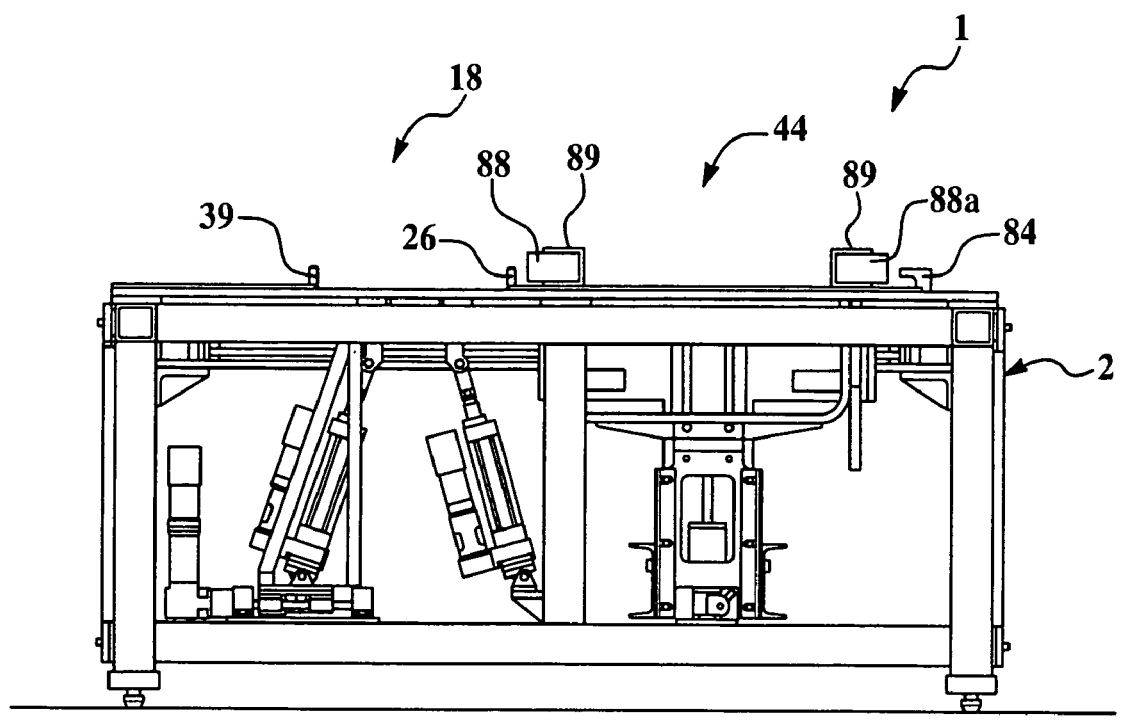

An L-shaped mandrel cradle 51 is provided on each cradle position block 49. Accordingly, each mandrel cradle 51 is selectively positional between a first position shown in FIG. 11 and a second position shown in FIG. 13, in which second position the mandrel cradle 51 has been rotated 90 degrees with respect to the first position, according to a technique which will be hereinafter described. Depending on the position of the linear rail carriage 57 and yoke assembly 56 on the carriage tracks 58 of the cabinet 55, each pair of mandrel cradles 51 extends through the module slot 16 of the corresponding module unit 8, as shown in FIGS. 13 and 14, or is disposed beneath the top surface of the module unit 8, as shown in FIG. 15. At least one pivot stop pin 64 may extend from each cradle support 47 to prevent each mandrel cradle 51 from pivoting beyond the position shown in FIG. 6.

The jack screws and ball nuts 63a can be extended from the respective jack screw housings 63 of the respective pair of jack screw housing servo motors (I/O to raise each yoke assembly 56, via the linear rail carriage 57, through the corresponding module slot 16 (FIG. 1) in the table module 2. At a certain point during the lift, one leg of each mandrel cradle 51 indexes one of a left hand mandrel 88 and a right hand mandrel 88a, as shown in FIG. 5, during fabrication of a stringer 93 (FIG. 38), which will be hereinafter described. Continuing through the lift, a certain point is reached upon which the slider links 48 and the yoke assembly 56 reach their slide limit and force the mandrel cradles 51 to rotate. The halfway point of this rotation of the mandrel cradles 51 is shown in FIG. 5. Once the mandrel cradles 51 have rotated opposite one another and are locked into position by the ball detents 52, actuation of the jack screws and ball nuts 63a is reversed and the linear rail carriage 57 travels downwardly on the carriage tracks 58. As the linear rail carriage 57 continues its downward travel on the carriage tracks 58, the mandrel cradles 51 bump against the fixed cabinet 55 to release the ball detents 52, such that gravity returns the mandrel cradles 51 to the upright position.

As shown in FIGS. 1, 2, 7 and 8, the table module 2 of the structure assembly table 1 further includes multiple positioning assemblies 70 which facilitate selective positioning of the composite assembly and composite assembly components along the transverse axis of the table module 2 during fabrication of a stringer 93. In a typical embodiment, the structure assembly table 1 includes five positioning assemblies 70. As shown in FIG. 1, each positioning assembly 70 is typically provided between adjacent module units 8.

Figure 7:
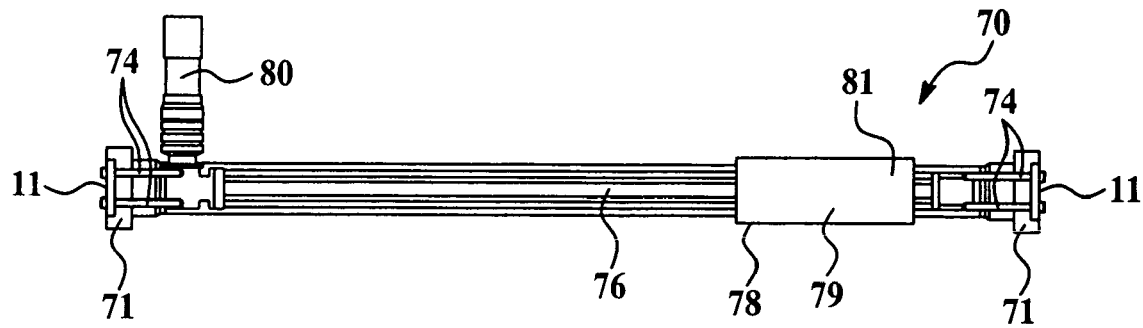
FIG. 7 is a top view of a positioning assembly of the structure assembly table.
Figure 8:
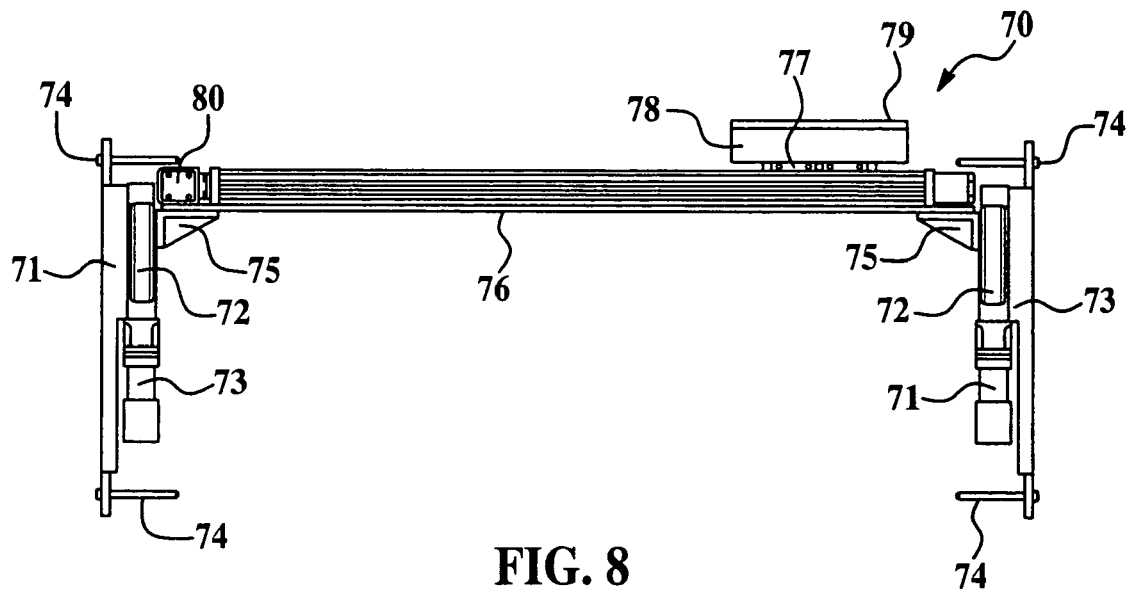
FIG. 8 is a front view of a positioning assembly of the structure assembly table.

As shown in FIGS. 7 and 8, each positioning assembly 70 typically includes a pair of generally parallel, spaced-apart vertical carriage supports 71. A vertical carriage 72 is slidably mounted on each vertical carriage support 71. An I/O capable vertical servo motor 73 is provided on each vertical carriage support 71 and operably engages each corresponding vertical carriage 72 to facilitate vertical travel of each vertical carriage 72 on the corresponding vertical carriage support 71. Fasteners 74 attach each vertical carriage support 71 of the positioning assembly 70 to a corresponding unit connector 11 which connects the adjacent module units 8 of the table module 2 to each other.

An elongated transverse carriage support 76 extends between the vertical carriages 72. The transverse carriage support 76 may be attached to the vertical carriages 72 via a pair of gusseted angle attach brackets 75, for example. A transverse carriage 77 is slidably mounted on the transverse carriage support 76. A riser block 78 is provided on the transverse carriage 77. A cover 79, such as a delrin cover, for example, is provided on the riser block 78. An I/O capable transverse servo motor 80 operably engages the transverse carriage 77 to facilitate selective travel of the transverse carriage 77 along the transverse carriage support 76. As shown in FIG. 7, a photoelectric sensor 81 is provided on the cover 79, which is adapted to detect the edge of a composite structure subassembly on the riser block 78 at five different locations of the composite structure subassembly during fabrication of the composite structure, as will be hereinafter described. In an illustrative embodiment of the structure assembly table 1, the photoelectric sensors 81 are spaced at forty (40) inch centers per table module 2. By operation of the vertical servo motors 73, the vertical carriages 72 travel vertically on the respective vertical carriage supports 71 and raise and lower the transverse carriage support 76 and riser block 78 with respect to the top surface of the table module 2. By operation of the transverse servo motor 80, the transverse carriage 77 and riser block 78 travel in a selected direction along the transverse carriage support 76.

As further shown in FIGS. 1 and 2, a compactor head 84 extends through the module slot 16 of each module unit 8. A compactor assembly (not shown) is typically supported by the module unit frame 9 of each module unit 8, beneath the top plate 14. The compactor assembly typically includes a pneumatically-actuated cylinder (not shown) which engages the compactor head 84 to facilitate selective bidirectional travel of the compactor head 84 along the module slot 16 of the corresponding module unit 8. Accordingly, responsive to operation of the compactor assembly, the compactor head 84 is capable of travel between the far right position shown in FIG. 23 and the position shown in FIG. 24 for purposes which will be hereinafter described.

A computerized controller (not shown) is connected to the actuating ballscrew housing servo motor (I/O) 20 and the actuating ballscrew housing servo motor (I/O) 36 of each flipper assembly 18; the actuating jack screw housing servo motor (I/O) 63 (FIG. 2) of each flopper assembly 44; and the servo motors (I/O) 73 and the servo motor (I/O) 80 (FIG. 8) of each positioning assembly 70 to facilitate automated fabrication of a composite structure 87, as will be hereinafter described with respect to FIGS. 9-38.

Referring next to FIGS. 9-38, implementation of the composite structure assembly table 1 in the fabrication of a composite aircraft stringer 93 (FIG. 38) will be described. It will be recognized and understood that the composite structure assembly table 1 can be configured to fabricate a variety of composite aircraft stringers 93. Furthermore, the composite structure and assembly table 1 can be readily re-configured to accommodate stringers of various sizes and configurations, as needed. Multiple table modules 2 can be placed in end-to-end relationship with respect to each other to form a composite structure assembly table 1 of selected length depending on the length of the aircraft stringer 93 to be fabricated using the composite structure assembly table 1.

Figure 9:
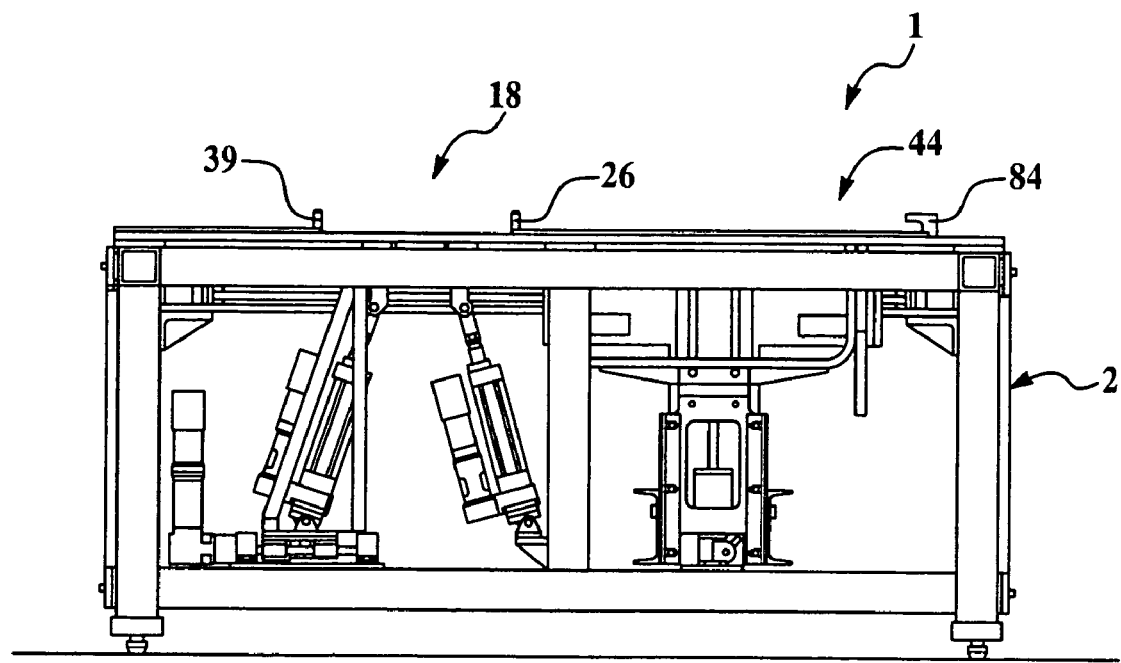
FIGS. 9-38 illustrate sequential fabrication of a composite structure in typical implementation of the structure assembly table.
Figure 10:
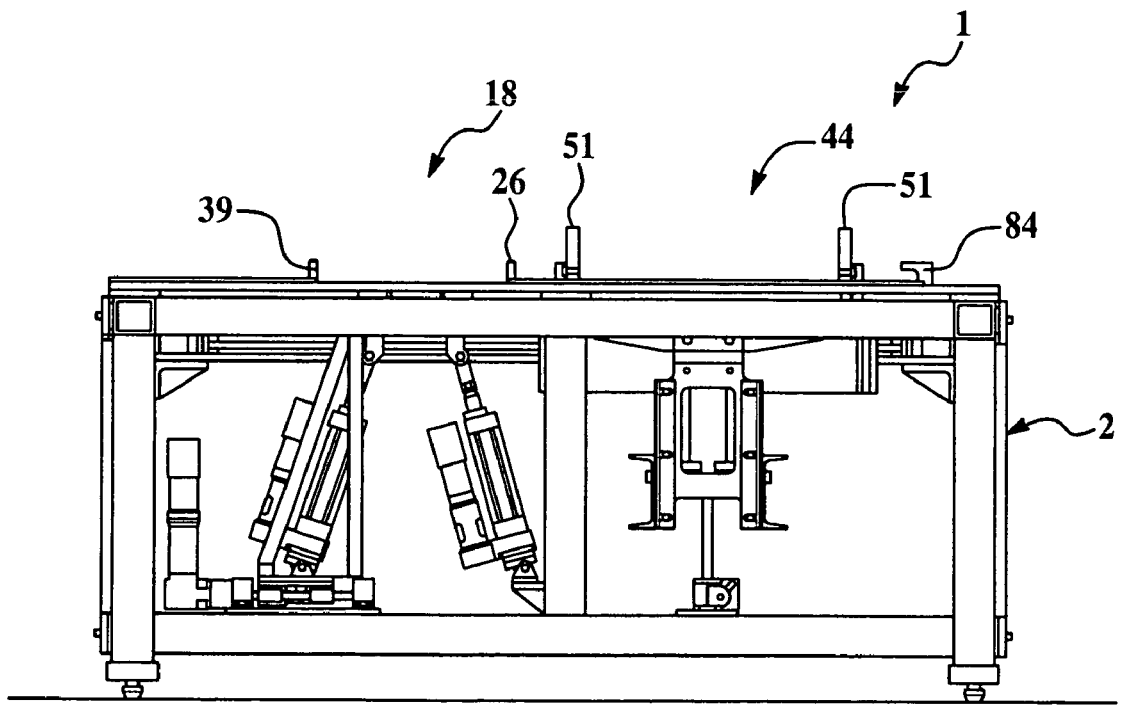
Figure 11:
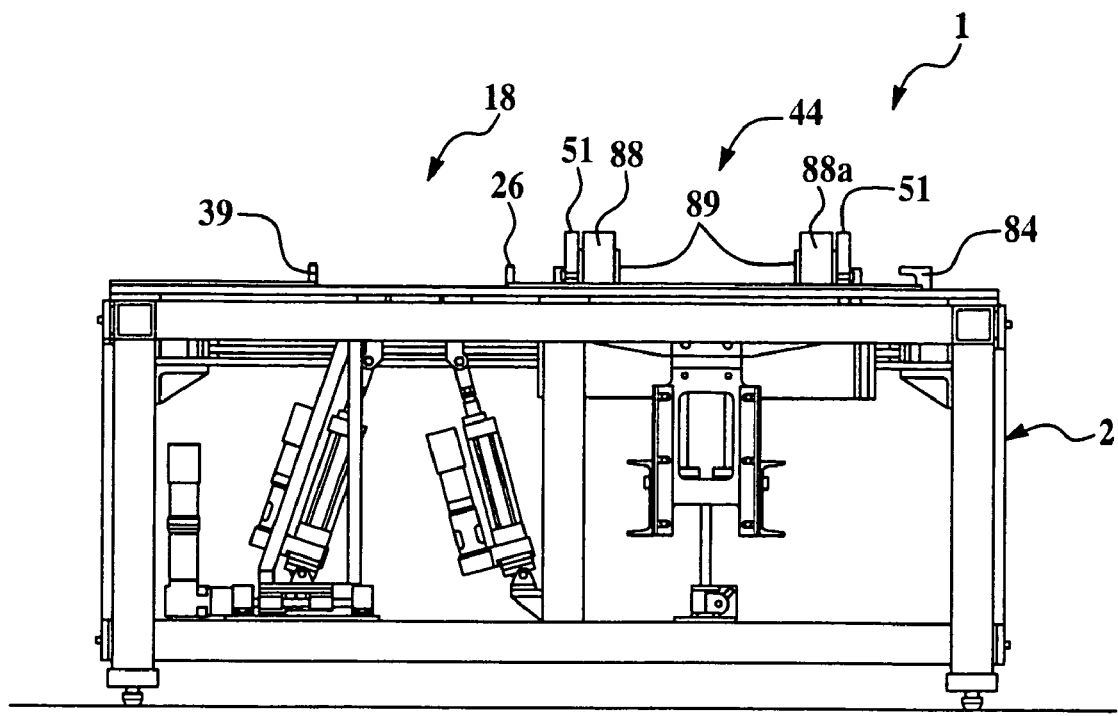

In FIG. 9, operation of the composite structure assembly table 1 begins by controller input of table configuration, depending on the type of aircraft stringer 93 (FIG. 38) which is to be fabricated, into the computerized controller (not shown). The table configuration includes such parameters as the length of the stringer 93 and the variations in thickness along the length of the stringer 93, for example. In FIG. 10, the flopper assemblies 44 are operated to extend the pairs of mandrel cradles 51 through the respective module slots 16 (FIG. 1) in the table module 2 of the structure assembly table 1. In FIG. 11, a left hand mandrel 88 and a right hand mandrel 88a, each of which receives a pair of respective C-shaped stringer charges 89, is placed on the mandrel cradles 51 of the flopper assemblies 44. The left hand mandrel 88 and right hand mandrel 88a extend in generally parallel relationship with respect to the longitudinal axis of the table module 2 and each other.

Figure 12:
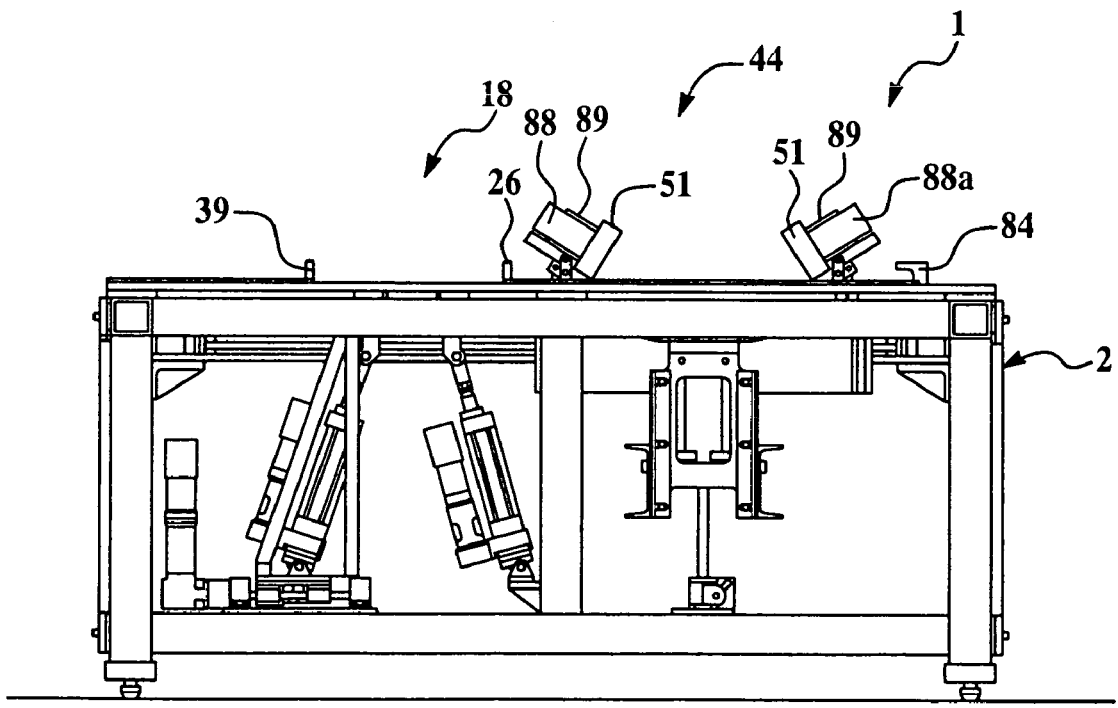

In FIGS. 12 and 13, the mandrel cradles 51 of the respective flopper assemblies 44 are rotated outwardly to turn the left hand mandrel 88 and right hand mandrel 88a and respective stringer charges 89 away from each other in a horizontal orientation, as shown in FIG. 13. The flopper assemblies 44 are shown with the mandrels 88, 88a and stringer charges 89 in the raised position in FIG. 5. In FIG. 14, the mandrel cradles 51 are lowered to rest the mandrels 88, 88a onto the top plates 14 (FIG. 1) or top surface of the table module 2. In FIG. 15, the mandrel cradles 51 are lowered beneath the surface of the table module 2.

Figure 16:
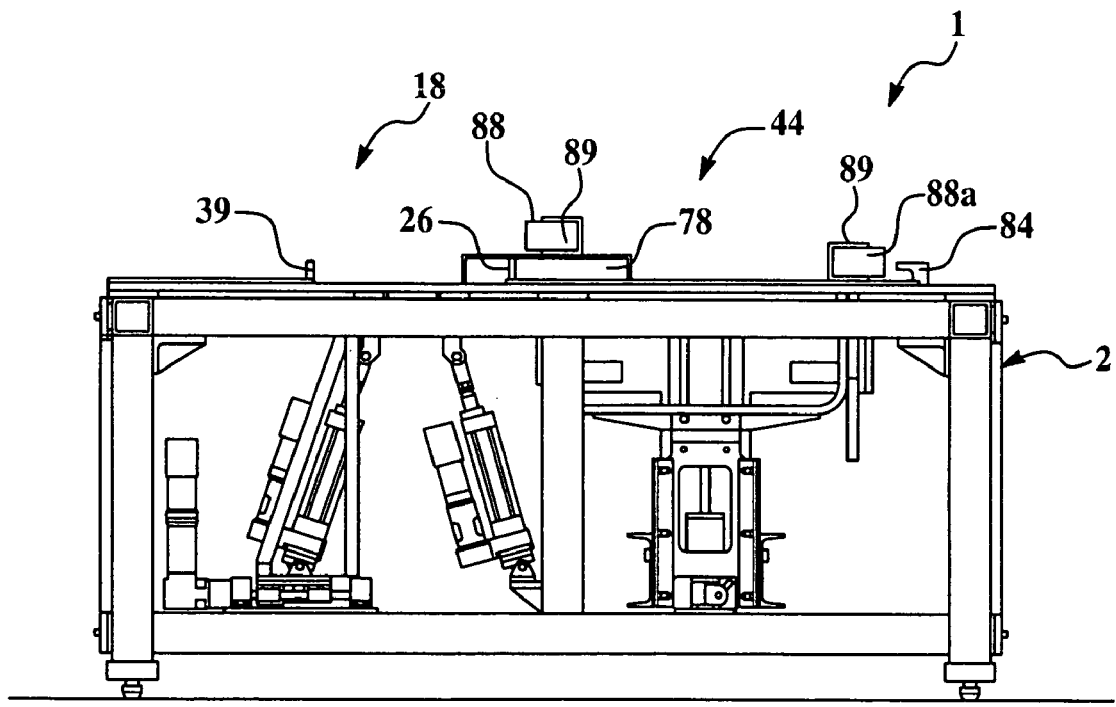
Figure 17:
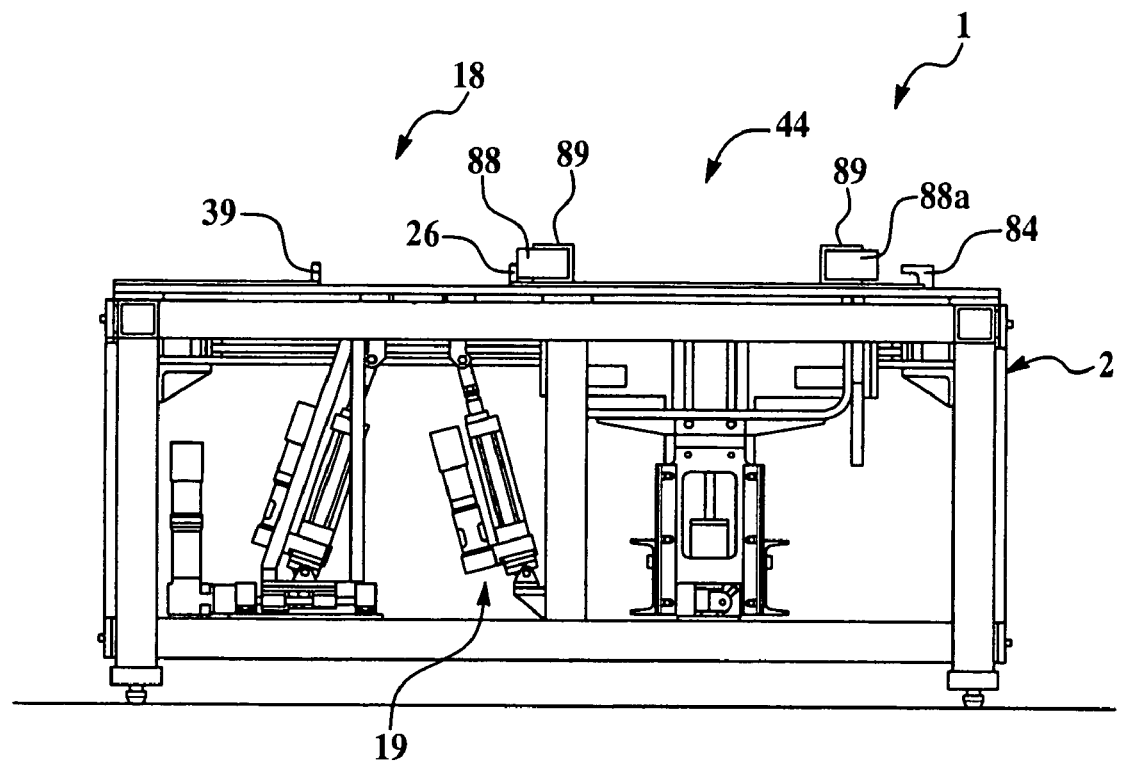
Figure 18:
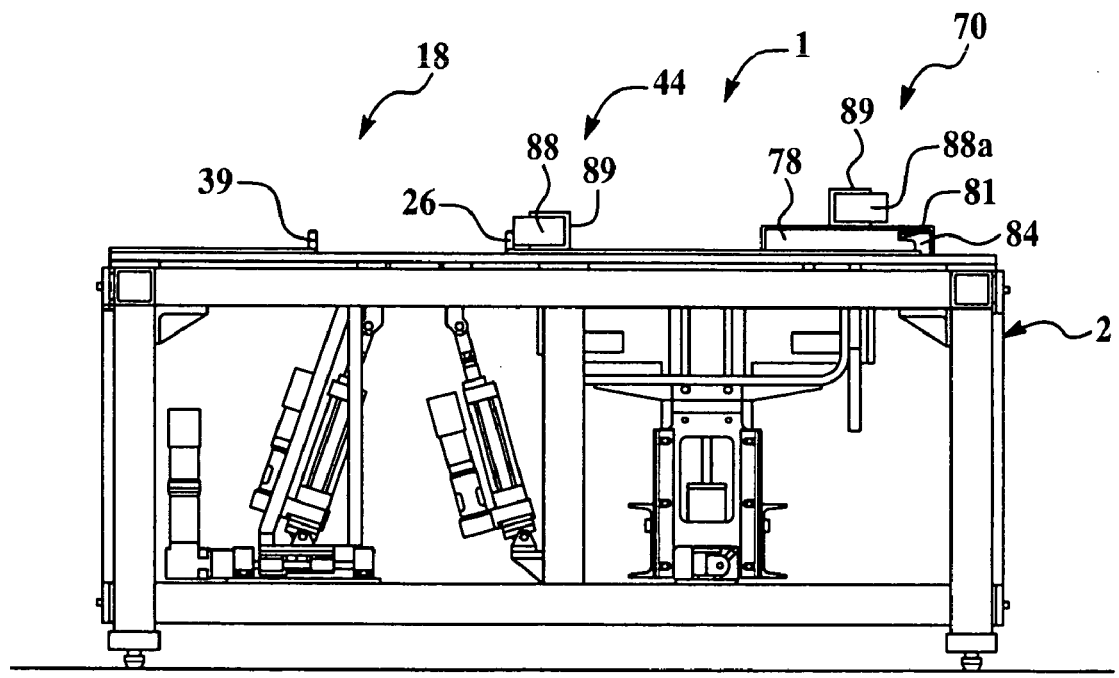
Figure 19:
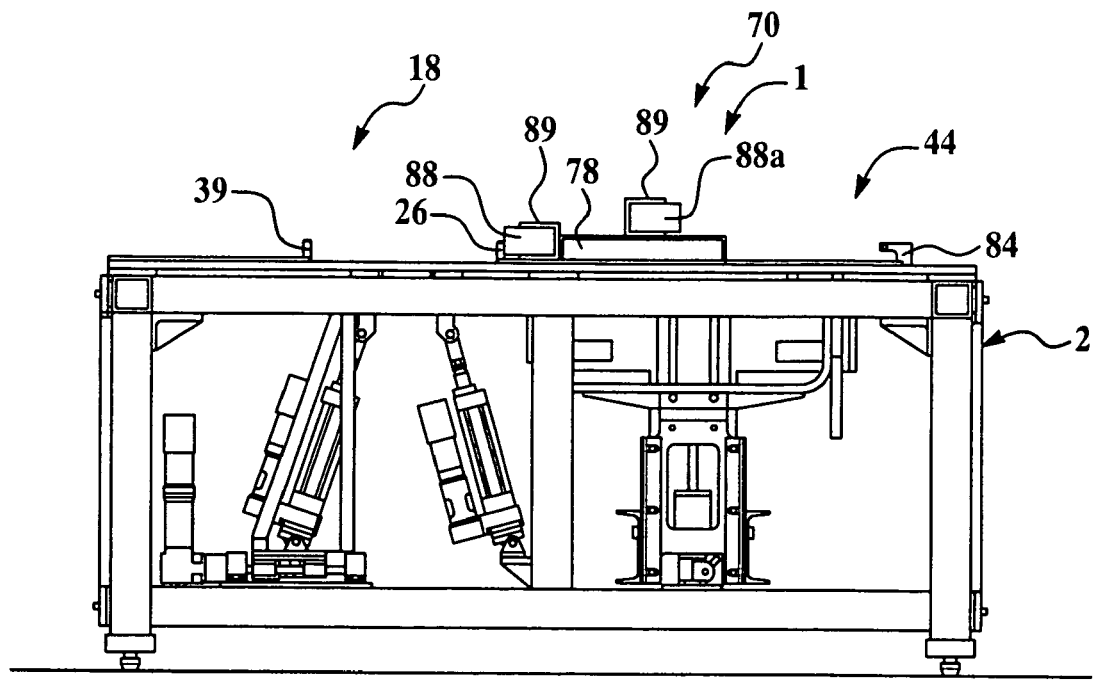
Figure 20:
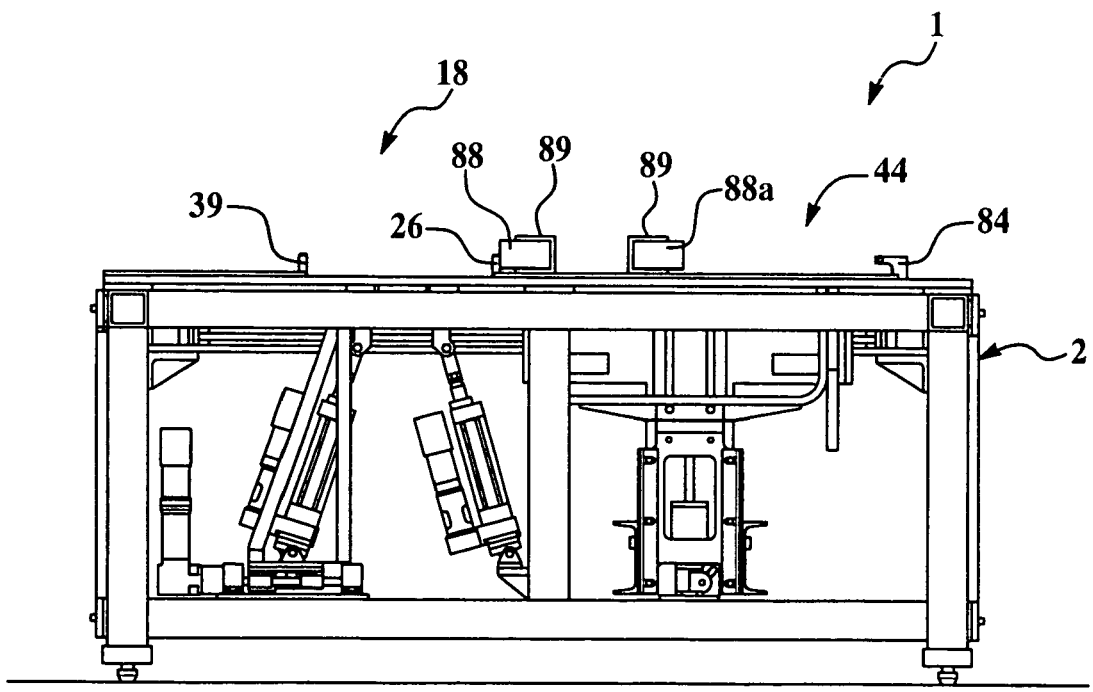

In FIG. 16, left hand mandrel 88 and composite charge 89 are sensed for location then lifted. A traverse move of the riser blocks 78 positions 88 and 89 next to support pins 26 of fixed flipper 19 as shown in FIG. 17. In FIG. 18, the riser blocks 78 of the positioning assemblies 70 have sensed position relative to the right-hand mandrel 88a and 89 by operation of the photoelectric sensors 81. Then, the right-hand mandrel 88a is lifted above the surface of the table module 2. The left-hand mandrel 88 remains on the top surface of the table module 2, as previously located. In FIG. 19, the positioning assemblies 70 are operated to move the riser blocks 78, and the right-hand mandrel 88a, toward and adjacent to the left-hand mandrel 88. In FIG. 20, the riser blocks 78 (FIG. 7) have been lowered beneath the top surface of the table module 2 to rest the right-hand mandrel 88a on the table module 2. Next, the photoelectric sensors 81 (FIG. 7) on the respective riser blocks 78 sense the location of the edge of the right-hand mandrel 88a. This location is used by the system controller to calculate straight-line final placement of the right-hand mandrel 88a.

Figure 21:
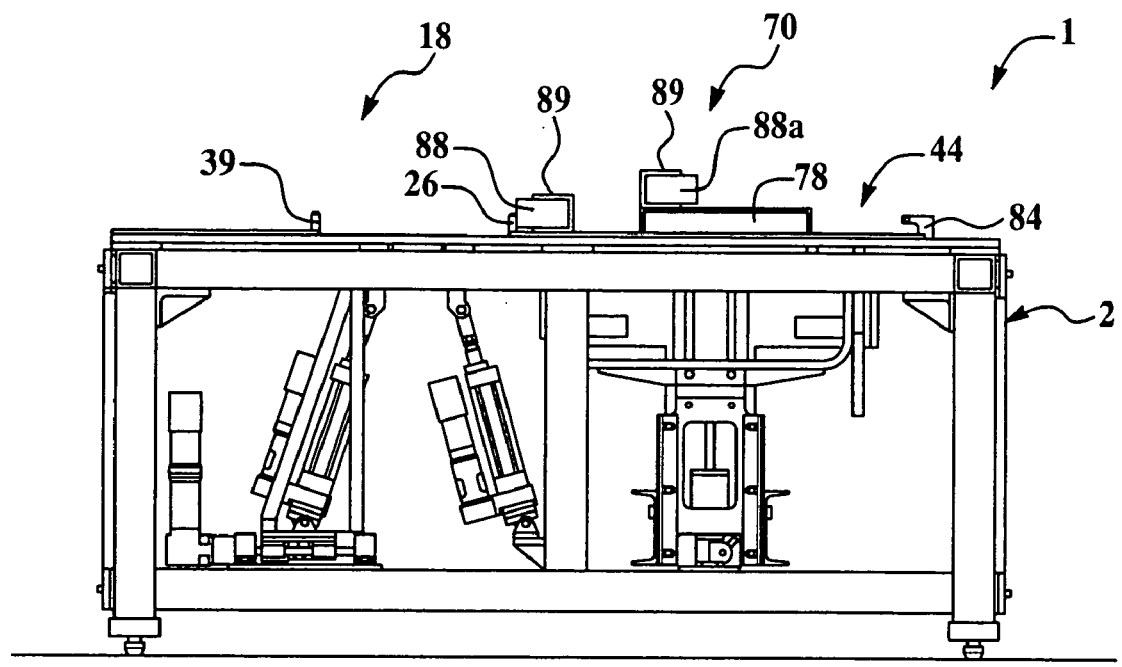
Figure 22:
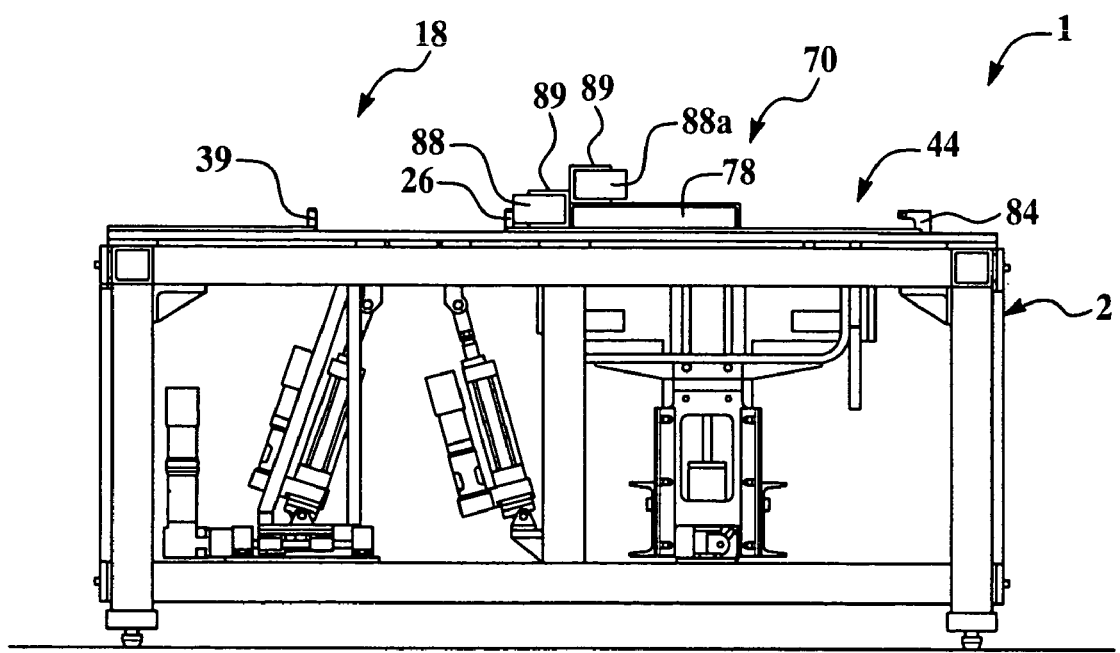
Figure 23:
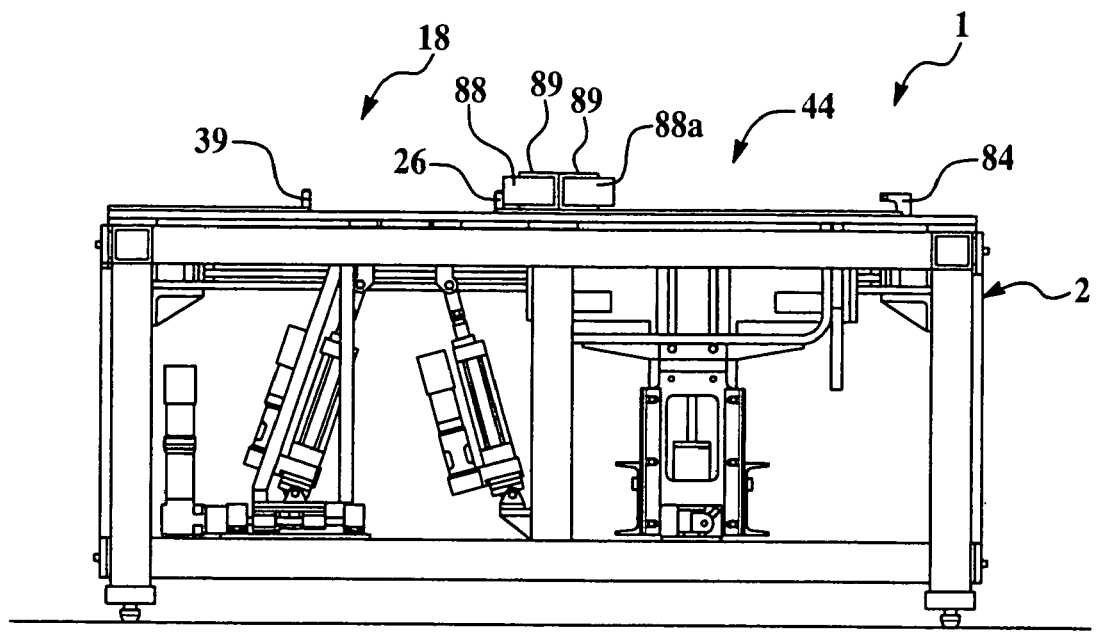

In FIG. 21, the riser blocks 78 have located the right-hand mandrel 88a and lifted the right-hand mandrel 88a above the top surface of the table module 2. This step begins final placement of the right-hand mandrel 88a. In FIG. 22, the riser blocks 78 have moved the right-hand mandrel 88a toward and immediately adjacent to the left-handed mandrel 88, with the webbing of the stringer charges 89 on the respective mandrels 88, 88a typically disposed in contact with each other. In FIG. 23, the riser blocks 78 have been lowered beneath the top surface of the table module 2.

Figure 24:
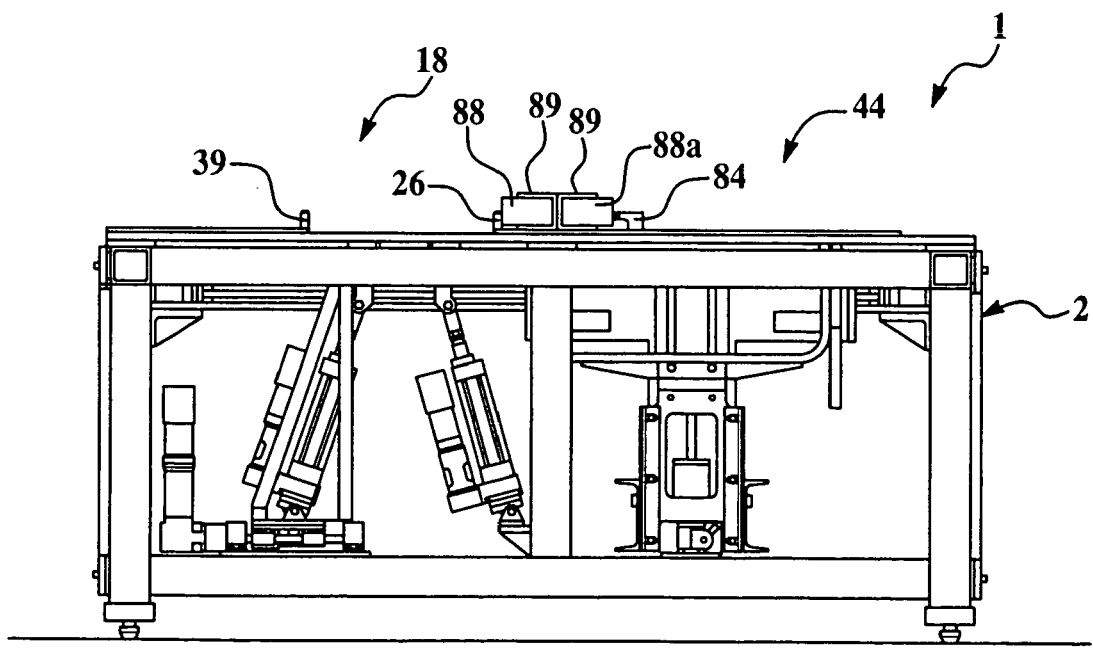
Figure 25:
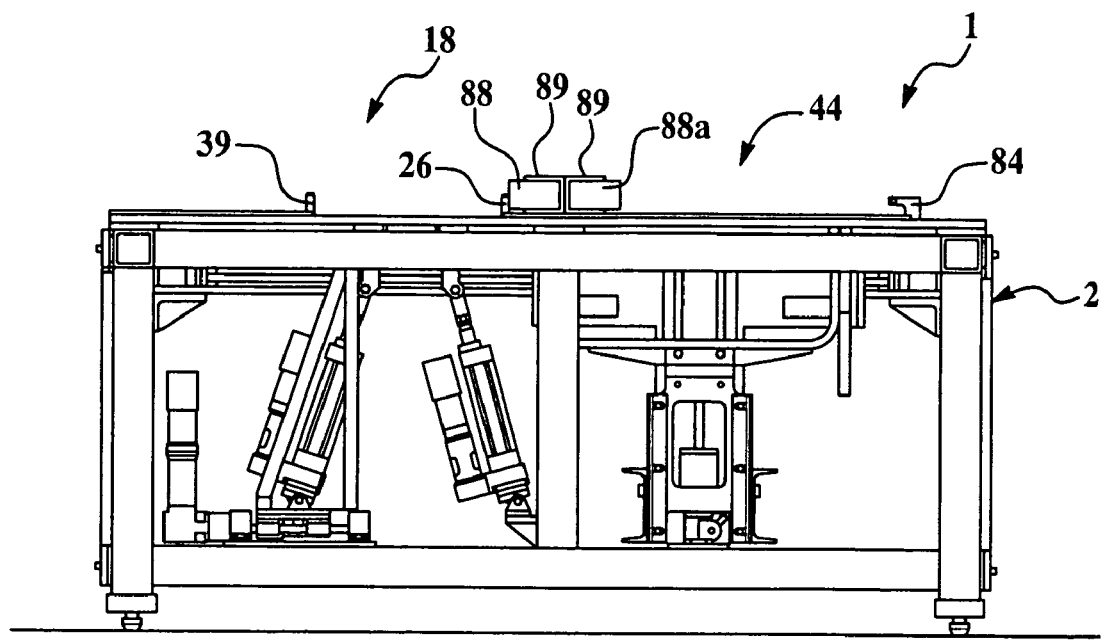

In FIG. 24, the compactor assembly (not shown) has moved the compactor head 84 from the far right-hand "home" position at the non-operator side 5 of the table module 2, as shown in FIG. 23, toward and then against the right-hand mandrel 88a, as shown in FIG. 24. The left-hand mandrel 88 engages the support pins 26 on the respective flipper blades 23 (FIG. 2) of the flipper assemblies 18. Therefore, the webbing of the C-shaped stringer charges 89 on the respective mandrels 88, 88a are pressed against and joined to each other under pressure for a time. In FIG. 25, the compactor head 84 has returned to the far right-hand "home" position at the non-operator side 5 of the table module 2.

Figure 26:
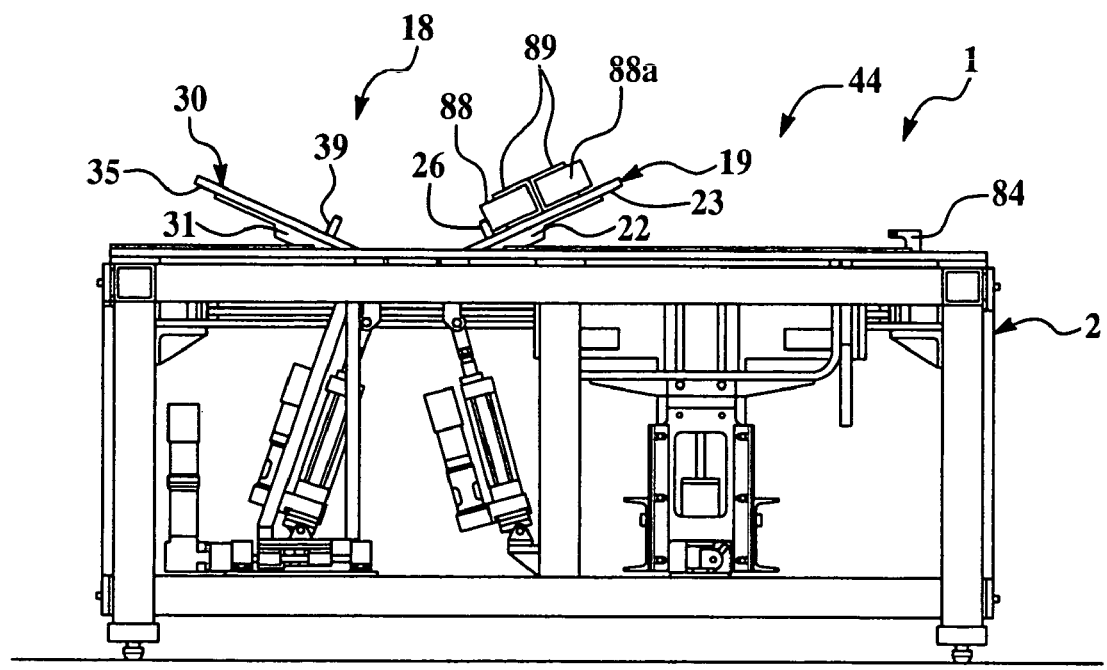
Figure 27:
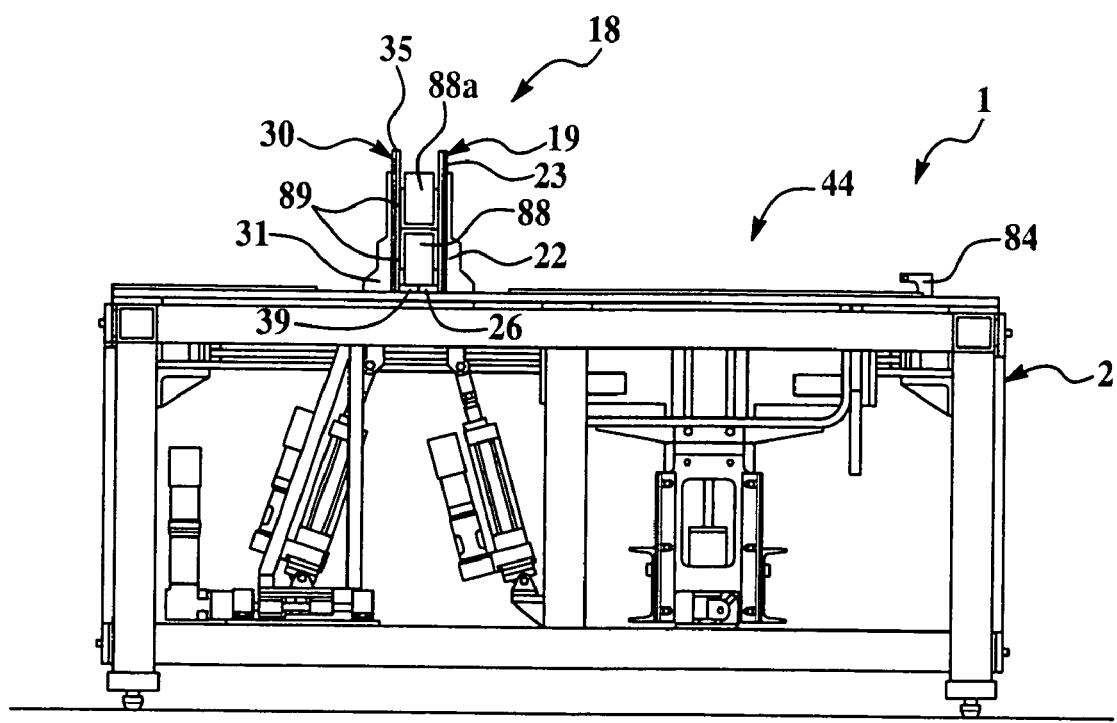
Figure 28:
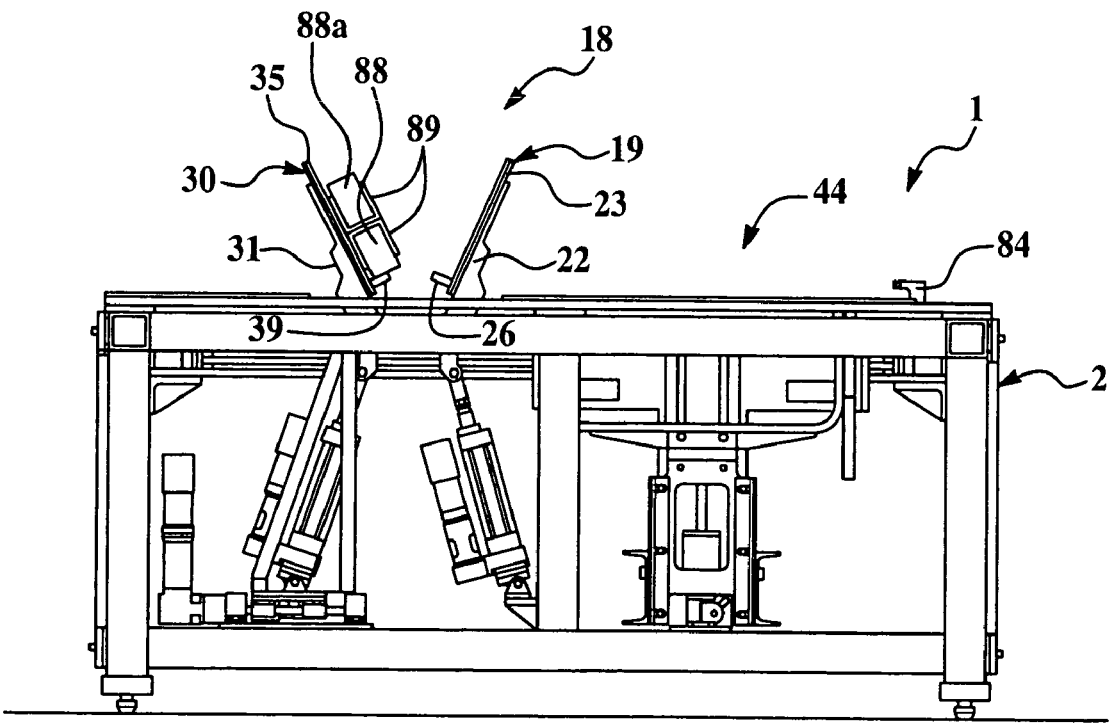
Figure 29:
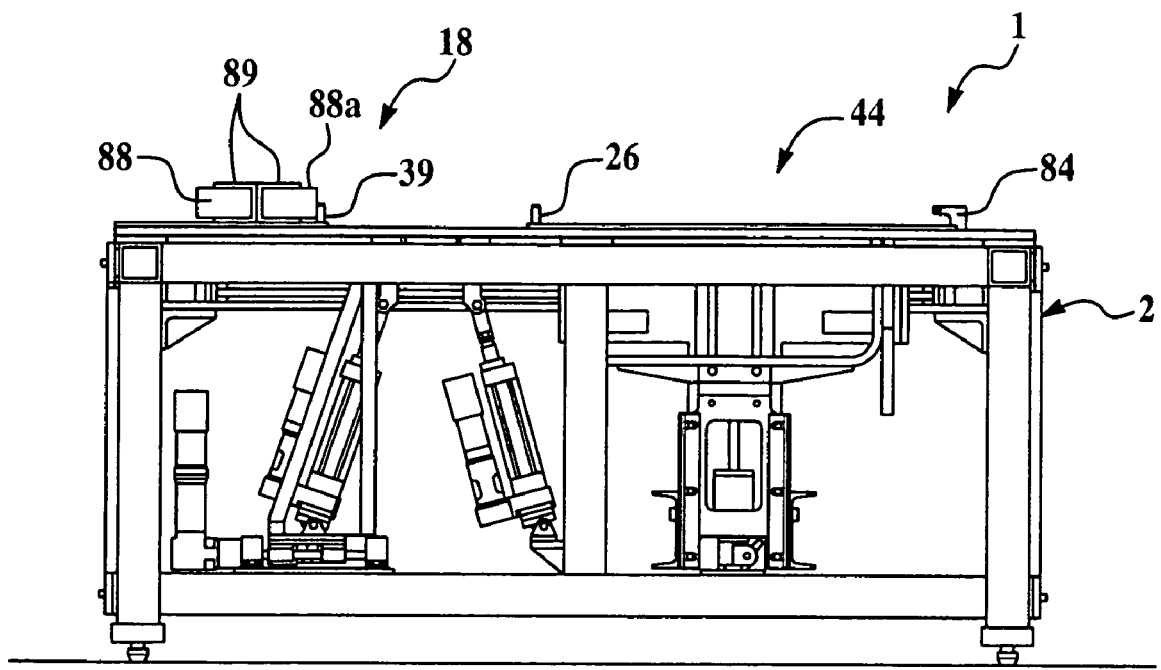

In FIGS. 26 and 27, the flipper assemblies 18 have begun to raise the fixed position flipper device 19 and the adjustable position flipper device 30 above the plane of the top surface of the table module 2. The flipper blade 23 of the fixed position flipper device 19 rotates the mandrels 88, 88a and connected stringer charges 89 about ninety degrees. At the end of the lifting or rotating movement, the mandrels 88, 88a and connected stringer charges 89 are positioned between the flipper blade 23 of the fixed position flipper device 19 and the flipper blade 35 of the adjustable position flipper device 30, as shown in FIG. 27. In FIG. 28, the mandrels 88, 88a and stringer charges 89 have been transferred from the flipper blade 23 of the fixed position flipper device 19 to the flipper blade 35 of the adjustable position flipper device 30. In FIG. 29, the flipper blade 23 and the flipper blade 35 have been lowered beneath the top surface of the table module 2, with the mandrels 88, 88a and stringer charges 89 resting on the operator side top surface of the table module 2. It will be appreciated by those skilled in the art that the independent adjustment capability of the adjustable position flipper device 30 of each flipper assembly 18 are capable of compensating for taper and ply thickness variations along the length of the mandrel assembly. Referring again to FIG. 2, the linear slide 38 facilitates positioning of each adjustable position flipper device 30 with respect to the corresponding paired fixed position flipper device 19 during repositioning of the mandrel assembly in order to compensate for these taper and ply thickness variations.

Figure 30:
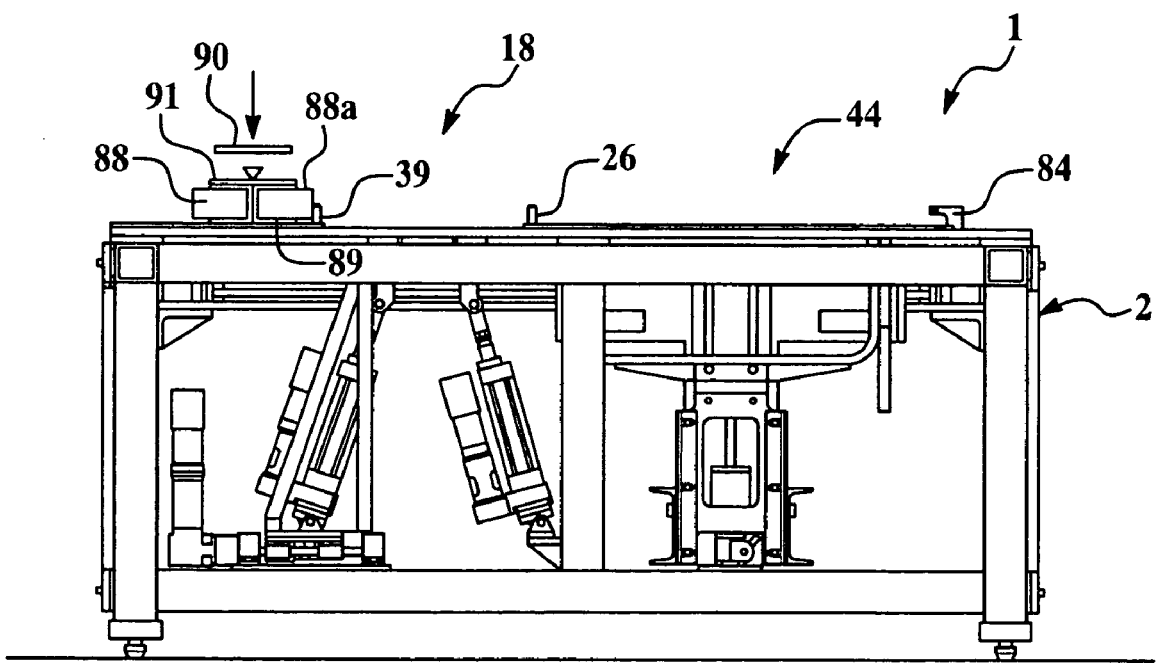

In FIG. 30, a radius filler 91 is applied to the triangular crevice which extends between and along the connected stringer charges 89. A bottom cap 90 is applied to the stringer charges 89, over the radius filler 91. Application of the radius filler 91 and bottom cap 90 to the stringer charges 89 can be carried out using a manual process, according to the knowledge of those skilled in the art.

Figure 31:
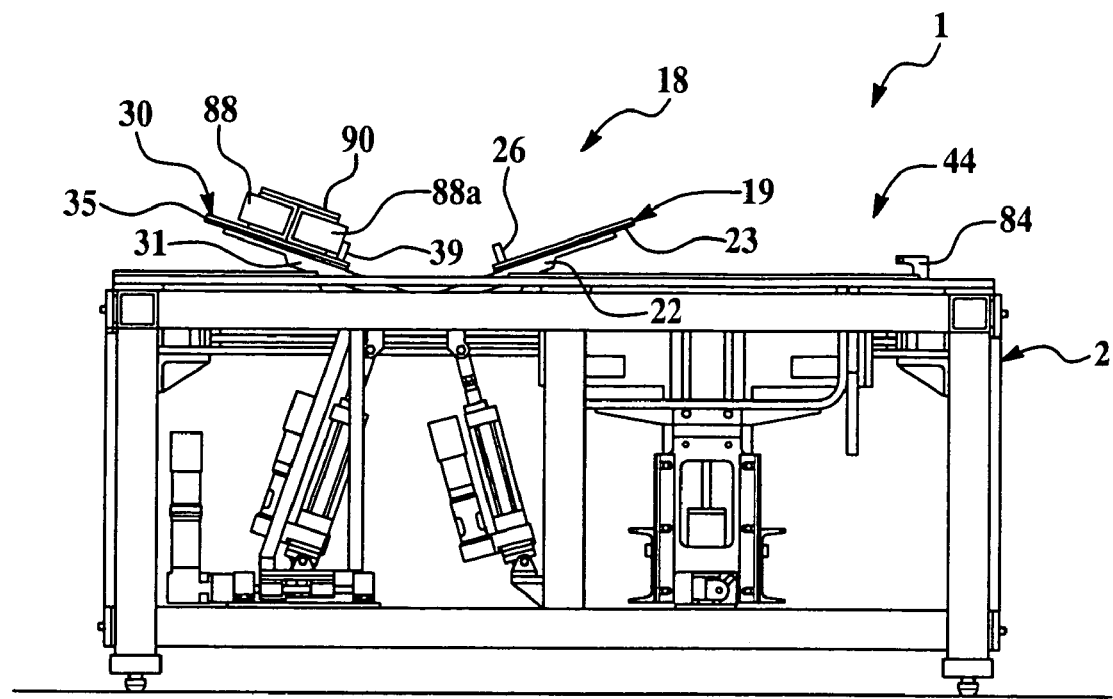
Figure 32:
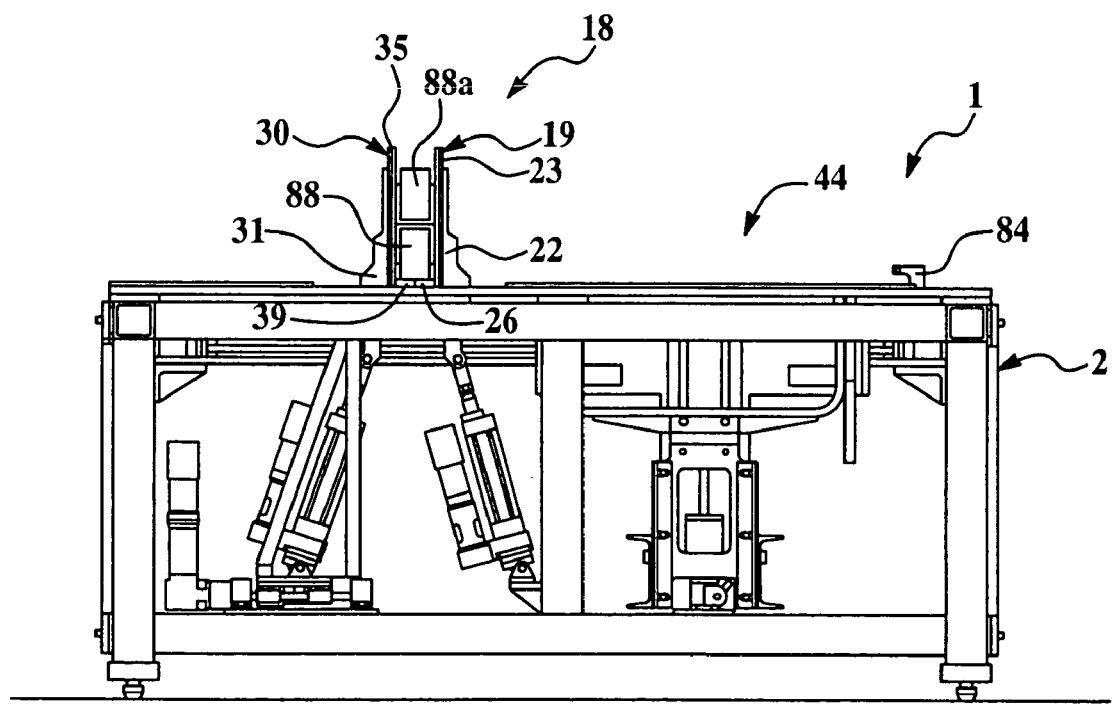
Figure 33:
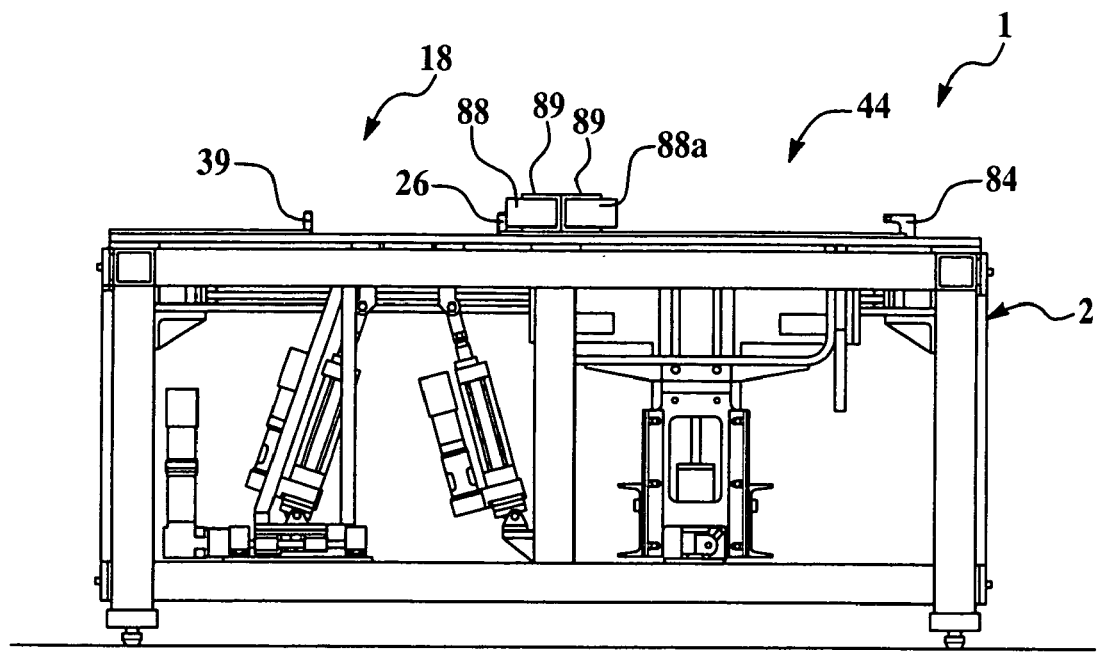
Figure 34:
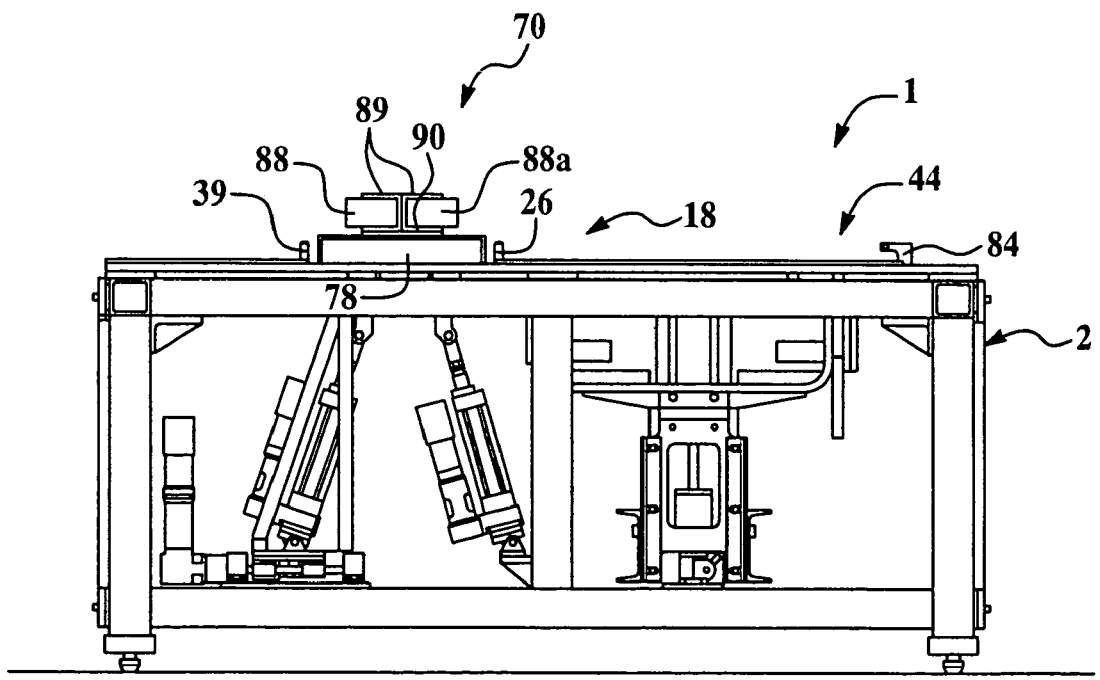
Figure 35:
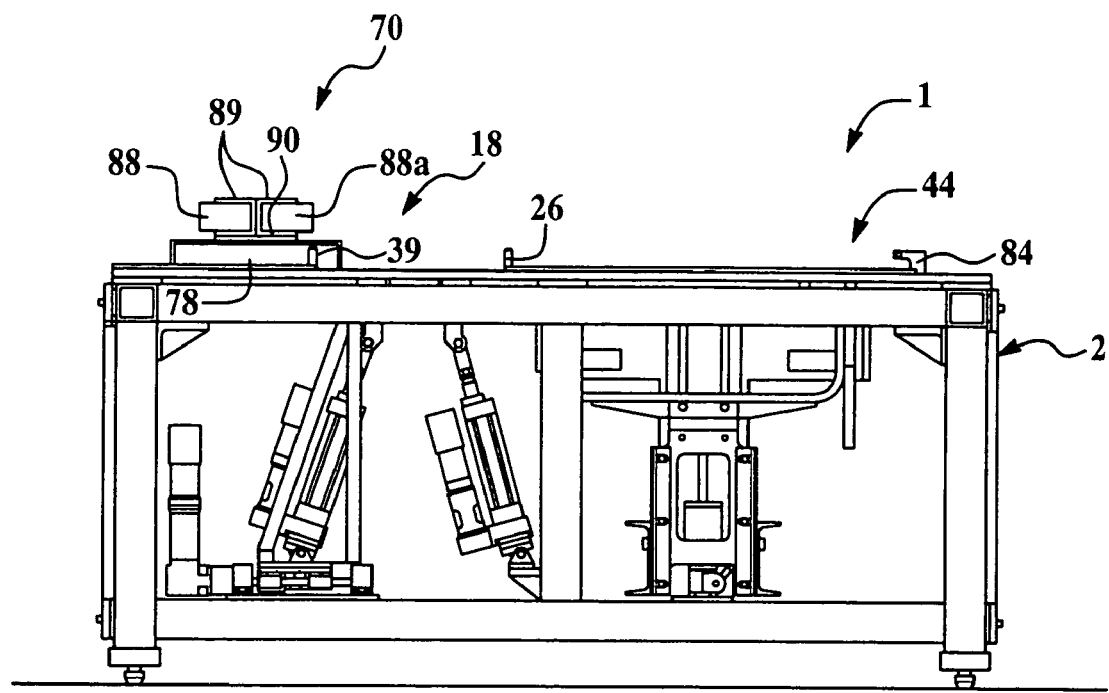

In FIGS. 31-33, the mandrels 88, 88a and connected stringer charges 89 are raised from the surface of the table module 2 and rotated 90 degrees as they are transferred from the flipper blade 35 of the adjustable position flipper device 30 to the flipper blade 23 of the fixed position flipper device 19. The mandrels 88, 88a and stringer charges 89 are additionally shown engaged by the flipper assemblies 18 in the raised position in FIG. 3. The mandrels 88, 88a and stringer charges 89 are then rotated another 90 degrees as the flipper blade 23 of the fixed position flipper device 19 rests the mandrels 88, 88a and stringer charges 89 on the top surface of the table module 2, respectively. In FIG. 34, the riser blocks 78 of the positioning assemblies 70 have located and raised the mandrels 88, 88a and stringer charges 89 above the surface of the table module 2 and support pin 26. In FIG. 35, the riser blocks 78 have moved the mandrels 88, 88 and stringer charges 89 to the operator side 4 of the table module 2.

Figure 36:
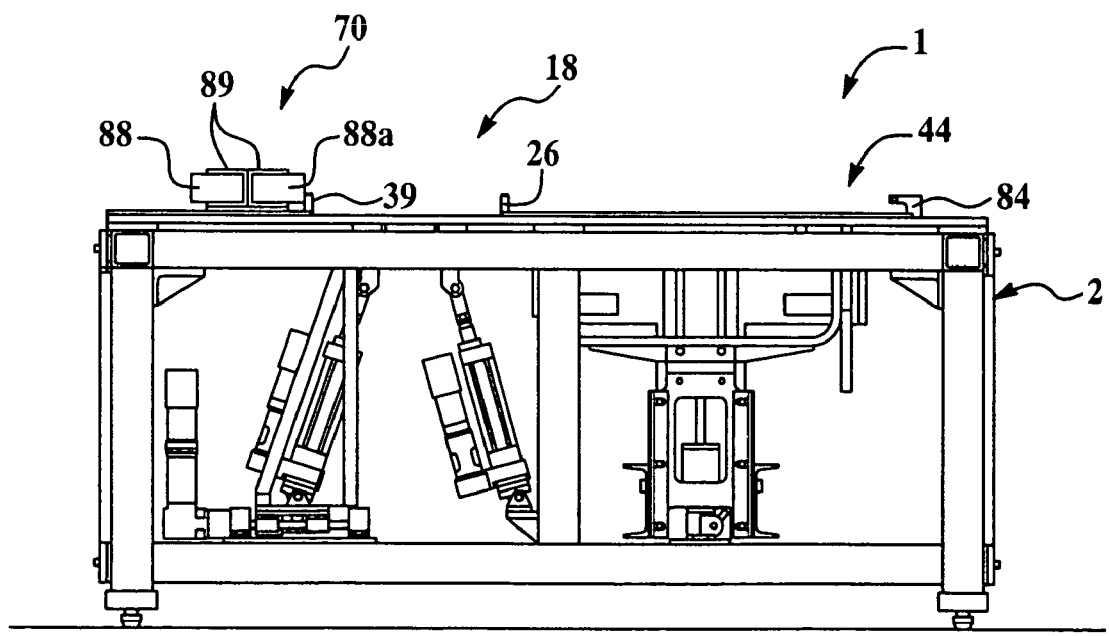
Figure 37:
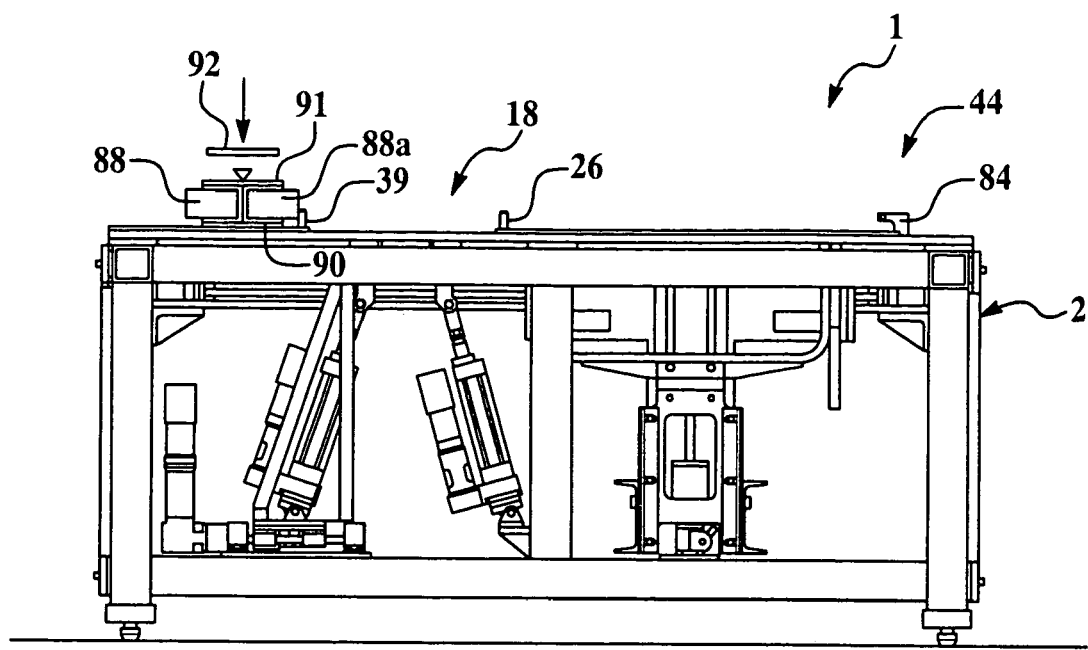
Figure 38:
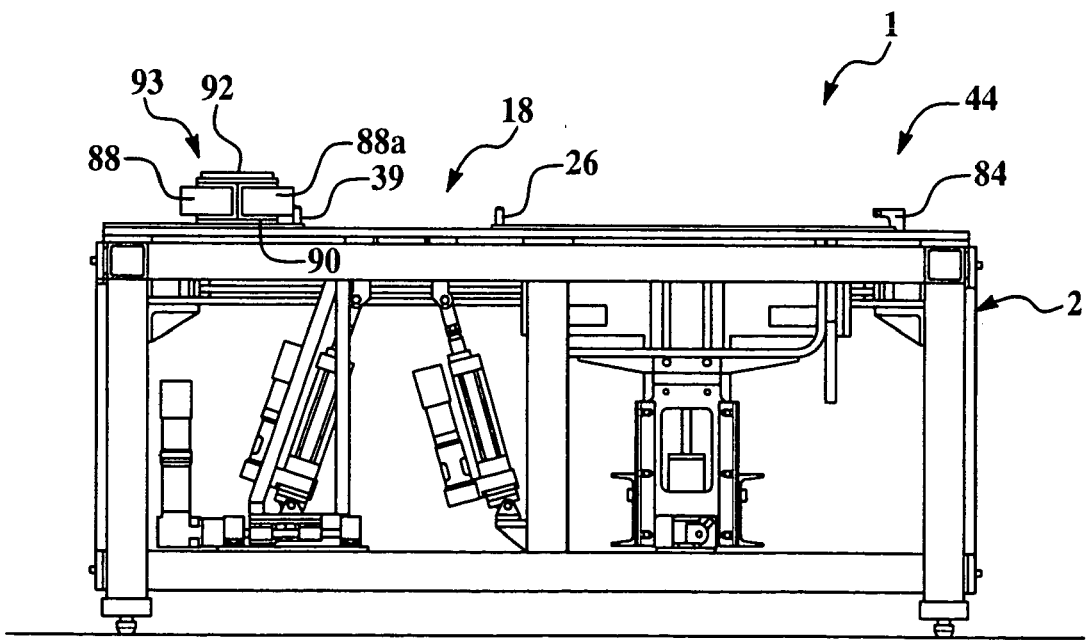

In FIG. 36, the riser blocks 78 have lowered the mandrels 88, 88a and stringer charges 89 onto the top surface of the table module 2. In FIG. 37, a radius filler 91 is applied to the triangular crevice between the stringer charges 89. A top cap 92 is applied to the stringer charges 89, over the radius filler 91. Application of the radius filler 91 and top cap 92 to the stringer charges 89 can be carried out using a manual process, according to the knowledge of those skilled in the art. As shown in FIG. 38, application of the radius filler 91 and top cap 92 to the stringer charges 89 completes fabrication of the stringer 93. The completed stringer 93 is then readied for access by an operator for transport from the structure assembly table 1 to a subsequent processing station (not shown).

Although this invention has been described with respect to certain exemplary embodiments, it is to be understood that the specific embodiments are for purposes of illustration and not limitation, as other variations will occur to those of ordinary skill in the art.

What is claimed is:

1. A device for assembling a composite structure, comprising:
   a table module;
   a first plurality of flipper devices carried by said table module;
   a second plurality of flipper devices carried by said table module in adjacent and adjustable relationship with respect to said first plurality of flipper devices, respectively, each of said second plurality of flipper devices including a linear slide carried by said table module, a containment frame carried by said linear slide, a ballscrew housing carried by said containment frame, a ballscrew extendable from said ballscrew housing, a pivot rod carried by said containment frame and a flipper blade pivotally carried by said pivot rod and engaged by said ballscrew; and whereby said first plurality of flipper devices and said second plurality of flipper devices are capable of accommodating a variation in thickness of the composite structure.

2. The device of claim 1 further comprising a flipper blade frame pivotally carried by said pivot rod and wherein said flipper blade extends from said flipper blade frame.

3. The device of claim 1 wherein each of said second plurality of flipper devices is computer-controlled.

4. The device of claim 1 wherein said table module comprises a plurality of adjacent module units and each of said first plurality of flipper devices and each of said second plurality of flipper devices is provided on a corresponding one of said plurality of module units.

5. The device of claim 4 wherein said plurality of adjacent module units comprises a plurality of module unit frames and each of said first plurality of flipper devices and each of said second plurality of flipper devices is carried by a corresponding one of said plurality of module unit frames.

6. The device of claim 1 wherein said table module comprises a generally elongated, rectangular table module frame and said first plurality of flipper devices and said second plurality of flipper devices is carried by said table module frame.

7. The device of claim 6 wherein said first plurality of flipper devices each comprises a second ballscrew housing carried by said table module frame, a second ballscrew extendable from said second ballscrew housing and a second flipper blade pivotally carried by said second ballscrew.

8. A device for assembling a composite structure, comprising:

a table module having a generally elongated, rectangular table module frame;

a plurality of adjacent module units having a plurality of generally rectangular module unit frames, respectively, carried by said table module frame;

a first plurality of flipper devices carried by said plurality of module unit frames, respectively, each of said first plurality of flipper devices including a first ballscrew housing pivotally carried by a corresponding one of said module unit frames, a first ballscrew extendable from said first ballscrew housing and a first flipper blade pivotally carried by said first ballscrew;

a second plurality of flipper devices carried by said plurality of module unit frames, respectively, in adjacent and adjustable relationship with respect to said first plurality of flipper devices, respectively, each of said second plurality of flipper devices including a linear slide carried by a corresponding one of said module unit frames, a containment frame carried by said linear slide, a second ballscrew housing carried by said containment frame, a second ballscrew extendable from said second ballscrew housing, a pivot rod carried by said containment frame and a second flipper blade pivotally carried by said pivot rod and engaged by said second ballscrew; and whereby said first plurality of flipper devices and said second plurality of flipper devices are capable of accommodating a variation in thickness of the composite structure.

9. The device of claim 8 further comprising a first flipper blade frame pivotally carried by said first ballscrew and wherein said first flipper blade extends from said first flipper blade frame.

10. The device of claim 8 further comprising a second flipper blade frame pivotally carried by said pivot rod and wherein said second flipper blade extends from said second flipper blade frame.

11. The device of claim 8 wherein each of said second plurality of flipper devices is computer-controlled.

12. The device of claim 8 further comprising at least one support pin carried by each of said first flipper blade and said second flipper blade.

* * * * *

UNITED STATES PATENT AND TRADEMARK OFFICE
CERTIFICATE OF CORRECTION

| | | |
|---|---|---|
| PATENT NO. | : 7,644,491 B2 | Page 1 of 1 |
| APPLICATION NO. | : 11/582217 | |
| DATED | : January 12, 2010 | |
| INVENTOR(S) | : Joseph E. Absalonson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Sixteenth Day of November, 2010

David J. Kappos
*Director of the United States Patent and Trademark Office*